US012116925B1

(12) United States Patent
Warner

(10) Patent No.: US 12,116,925 B1
(45) Date of Patent: Oct. 15, 2024

(54) ROTARY ENGINE WITH DUAL AXIS ROTOR ROTATION

(71) Applicant: Dale Warner, New Port Richy, FL (US)

(72) Inventor: Dale Warner, New Port Richy, FL (US)

(*) Notice: Subject to any disclaimer, the term of this patent is extended or adjusted under 35 U.S.C. 154(b) by 0 days.

(21) Appl. No.: 18/734,274

(22) Filed: Jun. 5, 2024

(51) Int. Cl.
*F02B 55/08* (2006.01)
*F02B 53/04* (2006.01)
*F02B 53/12* (2006.01)
*F02B 55/02* (2006.01)
*F02B 53/00* (2006.01)

(52) U.S. Cl.
CPC .............. *F02B 55/08* (2013.01); *F02B 53/04* (2013.01); *F02B 53/12* (2013.01); *F02B 55/02* (2013.01); *F02B 2053/005* (2013.01)

(58) Field of Classification Search
CPC .......... F02B 53/04; F02B 53/12; F02B 55/02; F02B 55/08; F02B 2053/005
See application file for complete search history.

(56) References Cited

U.S. PATENT DOCUMENTS 710,756 A 10/1902 Colbourne
3,439,654 A 4/1969 Cambell, Jr.
3,509,718 A * 5/1970 Fezer ........................ F01C 1/22 60/519
3,841,803 A * 10/1974 Morgan .................. F01C 21/04 123/196 R
4,018,548 A 4/1977 Berkowitz
5,271,364 A 12/1993 Snyder
5,341,782 A 8/1994 McCall et al.
6,386,838 B2 5/2002 Hoyt
7,549,289 B2 * 6/2009 Herring ................ F01C 11/004 60/519
9,175,682 B2 11/2015 Kerlin

FOREIGN PATENT DOCUMENTS

CN 105281513 A * 1/2016
WO 1999061751 A1 12/1999
WO 2013013250 A2 1/2013
WO 2020234614 A2 11/2020
WO 2021100058 A1 5/2021

* cited by examiner

*Primary Examiner* — Audrey B. Walter
(74) *Attorney, Agent, or Firm* — Johnson | Dalal; Mark C. Johnson

(57) ABSTRACT

A rotary engine with dual axis rotor rotation that includes a stator housing, two rotors within a combustion chamber, an output shaft with drive gears coupled thereto, and two planetary shafts parallel and flanking the output shaft, wherein the planetary shafts each include two freely rotatable planetary gears coupled, respectively, to each rotor and two sets of rotor drive gears of different radiuses that are operably coupled to the drive gears of the output shaft, wherein, during the completely combustion cycle the gear configurations and positions enable the first and second rotors to follow a dual axis, eccentric, counterclockwise, and out-of-phase rotation.

14 Claims, 13 Drawing Sheets

ROTARY ENGINE WITH DUAL AXIS ROTOR ROTATION

FIELD OF THE INVENTION

The present invention relates to rotary engines and, more specifically, relates to rotary engines having two rotors disposed therein that are operably configured to rotate in a counterclockwise rotation and in an eccentric motion.

BACKGROUND OF THE INVENTION

In a conventional internal combustion engine, valves are operated from a cam shaft rotating at approximately half the revolutions per minute of the crank shaft. Modern engines typically utilize a mechanism to alter the valve timing with respect to the crank shaft to improve performance over a range of revolutions per minute (RPMs). Engines operating with an Atkinson cycle may vary the duration of intake valve opening and it also delays closing the valve during into the compression cycle. This allows some of the air drawn into cylinder to return to the intake manifold before the valve closes and compression begins. With a reduced air charge in the cylinder, the compression ratio is effectively reduced. Thus, the Atkinson engine is defined as a variable compression engine. This allows the engine to optimally produce power when less than maximum power is demanded. The valve timing adjustment mechanism is used to adjust the phased relationship of the cam shaft and crank shaft. However, making these adjustments while the engine operating at normal RPMs and considering the loads imparted by the valve springs and inertia, the mechanism must be robust and limited in its range of authority. In a modern Atkinson engine, a practical limit of minimal compression ratio is about a 50% reduction.

A rotary engine is a type of internal combustion engine that is typically designed with an odd number of cylinders per row in a radial configuration. The engine's crankshaft generally remains stationary in operation, while the entire crankcase and its attached cylinders rotated around it as a unit. One type of rotary engine is referred to as a "Wankel engine". The Wankel engine uses an eccentric rotary design to convert pressure into rotating motion. Valves, camshaft, pushrods, rockers, and timing belt are generally eliminated due to intake and exhaust ports in the housing and/or end plates, wherein the intake and exhaust ports open and close directly by the motion of a rotor. The Wankel engine's rotor, which creates the turning motion, is similar in shape to a Reuleaux triangle, with the sides having less curvature. The rotor spins inside a figure-eight-like epitrochoidal housing, around a fixed-toothed gearing. The midpoint of the rotor moves in a circle around the output shaft, spinning the shaft via a cam. The rotor spins within a stator housing creating distinct chambers for intake, compression, ignition, and exhaust.

Whether a Wankel engine or other rotary engine, there are many drawbacks. Many of these known engines are heavy and burn significant amounts of oil, thus making them inefficient and minimizing their practical application. Many of these rotary engine designs generate a low torque output and high apex seal rubbing speeds. Furthermore, many of these known rotor engine designs suffer from high heat differentials around the stator and are unable to optimize valve timing with operating conditions.

Therefore, a need exists to overcome the problems with the prior art as discussed above.

SUMMARY OF THE INVENTION

The invention provides a rotary engine design that overcomes the hereinafore-mentioned disadvantages of the heretofore-known devices and methods of this general type and that provides a dual-axis rotor movement configuration that generates a uniform change in displacement with each degree of output shaft rotation. The uniform change in displacement allows an extended compression ratio variation when using an "Atkinson" cycle, which delays intake valve timing. This results in a linear range of oxygen input as the input valve timing and rpm varies. For example, the present invention may achieve a 40:1 range of oxygen input. Since oxygen content directly controls the power output, the 40:1 ratio is sufficient to control power output without the need for a throttle body. With the linear relationship, power output, compression ratio, fuel input, and ignition timing can all be controlled by timing of the output shaft. But to achieve this dynamic range, the valves need to be digitally controlled rather than minor adjustments available by mechanical controlling of cam shafts. Furthermore, the present invention also effectively transmits torque to the output shaft with no linear motion component.

With the foregoing and other objects in view, there is provided, in accordance with the invention, a rotary engine with dual axis rotor rotation having a stator housing with an inner wall surface defining a combustion chamber, a first rotor disposed within the combustion chamber, defining a first rotor cavity, and having three lobes, a second rotor disposed within the combustion chamber, defining a second rotor cavity, and having three lobes, an output shaft operably configured to rotate in a clockwise direction, disposed in the first rotor cavity and the second rotor cavity, and having a first plurality of first rotor drive gears fixedly coupled to the output shaft and each of a different radius and a second plurality of second rotor drive gears fixedly coupled to the output shaft and each of a different radius, and two planetary shafts. Specifically, a first planetary shaft is coupled to the stator housing in a stationary configuration, is disposed in the first rotor cavity and the second rotor cavity, is flanking and parallel to the output shaft, has a first planetary gear set axially disposed on, and operably configured to freely rotate on, the first planetary shaft, with a first shaft first rotor planetary rotor gear operably couplable to the first rotor, and with a plurality of first planetary shaft first rotor drive gears operably couplable to the first plurality of first rotor drive gears and each of a different radius, and has a second planetary gear set axially disposed on, and operably configured to freely rotate on, the first planetary shaft, with a first shaft second rotor planetary rotor gear operably couplable to the second rotor, and with a plurality of first planetary shaft second rotor drive gears operably couplable to the second plurality of second rotor drive gears and each of a different radius. A second planetary shaft is coupled to the stator housing in a stationary configuration, is disposed in the first rotor cavity and the second rotor cavity, is flanking and parallel to the output shaft, has a first planetary gear set axially disposed on, and operably configured to freely rotate on, the second planetary shaft, with a second shaft first rotor planetary rotor gear operably couplable to the first rotor, and with a plurality of second planetary shaft first rotor drive gears operably couplable to the first plurality of first rotor drive gears, each of a different radius, and operably configured to be in phase with the plurality of first planetary shaft first rotor drive gears, and has a second planetary gear set axially disposed on, and operably configured to freely rotate on, the second planetary shaft, with a second shaft second rotor planetary rotor gear operably couplable to the second rotor, and with a plurality of second planetary shaft second rotor drive gears operably couplable to the second plurality of second rotor drive gears, each of a different radius, and operably configured to be in phase with the plurality of second planetary shaft first rotor drive gears, wherein the first and second planetary gear sets on the respective first and second planetary shafts are operably configured to generate a dual axis, eccentric, counterclockwise, and out-of-phase rotation for the first and second rotors.

In accordance with a further feature of the present invention, the first planetary gear set on the first planetary shaft is axially aligned with the second planetary gear set on the first planetary shaft and the first planetary gear set on the second planetary shaft is axially aligned with the second planetary gear set on the second planetary shaft.

In accordance with an additional feature of the present invention, the first planetary shaft and the second planetary shaft are disposed in a parallel configuration with one another.

In accordance with another feature, an embodiment of the present invention includes the first plurality of first rotor drive gears having a first rotor high-speed drive gear defining a radius and having a first rotor low-speed drive gear defining a radius greater than the radius of the first rotor high-speed drive gear for the first plurality of first rotor drive gears and the second plurality of second rotor drive gears having a second rotor high-speed drive gear defining a radius equal to the radius of the first rotor high-speed drive gear for the first plurality of first rotor drive gears and having a second rotor low-speed drive gear defining a radius greater than the radius of the second rotor high-speed drive gear for the second plurality of second rotor drive gears and equal to the radius of the first rotor low-speed drive gear for the first plurality of first rotor drive gears.

In accordance with another feature, an embodiment of the present invention also includes the plurality of first planetary shaft first rotor drive gears having a planetary shaft high-speed gear with a discontinuous row of teeth defining a first HSG radius and operably couplable to the first rotor high-speed drive gear for the first plurality of first rotor drive gears and a planetary shaft low-speed gear with a discontinuous row of teeth defining a first LSG radius less than the first HSG radius defined by the planetary shaft high-speed gear on the plurality of first planetary shaft first rotor drive gears and operably couplable to the first rotor low-speed drive gear on the first plurality of first rotor drive gears. The plurality of first planetary shaft second rotor drive gears have a planetary shaft high-speed gear with a discontinuous row of teeth defining a first HSG radius and operably couplable to the second rotor high-speed drive gear for the second plurality of second rotor drive gears and a planetary shaft low-speed gear with a discontinuous row of teeth defining a first LSG radius less than the first HSG radius defined by the planetary shaft high-speed gear on the plurality of first planetary shaft second rotor drive gears and operably couplable to the second rotor low-speed drive gear on the second plurality of second rotor drive gears. The plurality of second planetary shaft first rotor drive gears have a planetary shaft high-speed gear with a discontinuous row of teeth defining a first HSG radius and operably couplable to the first rotor high-speed drive gear for the first plurality of first rotor drive gears and a planetary shaft low-speed gear with a discontinuous row of teeth defining a first LSG radius less than the first HSG radius defined by the planetary shaft high-speed gear on the plurality of second planetary shaft first rotor drive gears and operably couplable to the first rotor low-speed drive gear on the first plurality of first rotor drive gears. Additionally, the plurality of second planetary shaft second rotor drive gears have a planetary shaft high-speed gear with a discontinuous row of teeth defining a first HSG radius and operably couplable to the second rotor high-speed drive gear for the second plurality of second rotor drive gears and a planetary shaft low-speed gear with a discontinuous row of teeth defining a first LSG radius less than the first HSG radius defined by the planetary shaft high-speed gear on the plurality of second planetary shaft second rotor drive gears and operably couplable to the second rotor low-speed drive gear on the second plurality of second rotor drive gears.

In accordance with yet another feature, an embodiment of the present invention also includes a center plate coupled to the inner wall surface of the stator housing, interposed between the plurality of first planetary shaft first rotor drive gears and the plurality of first planetary shaft second rotor drive gears, interposed between the plurality of second planetary shaft first rotor drive gears and the plurality of second planetary shaft second rotor drive gears, and interposed between the first plurality of first rotor drive gears and the second plurality of second rotor drive gears to generate a first combustion chamber with the first rotor, the plurality of first planetary shaft first rotor drive gears, the plurality of second planetary shaft first rotor drive gears, and the first plurality of first rotor drive gears disposed therein and a second combustion chamber with the second rotor, the plurality of first planetary shaft second rotor drive gears, the plurality of second planetary shaft second rotor drive gears, and the second plurality of second rotor drive gears.

In accordance with an additional feature of the present invention, the plurality of first planetary shaft first rotor drive gears and the plurality of second planetary shaft first rotor drive gears are disposed in a rotationally inversely and symmetrical orientation to the plurality of first planetary shaft second rotor drive gears and the plurality of second planetary shaft second rotor drive gears relative to the center plate.

In accordance with a further feature, an embodiment of the present invention also includes the stator housing having a first enclosed spark plug port defined thereon and fluidly coupled to the first combustion chamber and a second enclosed spark plug port defined thereon and fluidly coupled to the second combustion chamber, the first and second enclosed spark plug ports each having a spark plug disposed therein, an enclosed intake port defined thereon and fluidly coupled to the first combustion chamber and a second enclosed intake port defined thereon and fluidly coupled to the second combustion chamber, the first and second enclosed intake ports each having an intake valve disposed therein, and an enclosed exhaust port defined thereon and fluidly coupled to the first combustion chamber and a second enclosed exhaust port defined thereon and fluidly coupled to the second combustion chamber, the first and second enclosed exhaust ports each having an exhaust valve disposed therein.

In accordance with an exemplary feature of the present invention, the spark plug, the exhaust valve, and the intake valve are communicatively coupled to an electronic controller.

In accordance with an additional feature, an embodiment of the present invention also includes a circumferential gap separating the discontinuous row of teeth on the planetary shaft low-speed gear for the plurality of first planetary shaft first rotor drive gears and circumferentially aligned with the discontinuous row of teeth on the planetary shaft high-speed gear for the plurality of first planetary shaft first rotor drive gears, a circumferential gap separating the discontinuous row of teeth on the planetary shaft low-speed gear for the plurality of first planetary shaft second rotor drive gears and circumferentially aligned with the discontinuous row of teeth on the planetary shaft high-speed gear for the plurality of first planetary shaft second rotor drive gears, a circumferential gap separating the discontinuous row of teeth on the planetary shaft low-speed gear for the plurality of second planetary shaft first rotor drive gears and circumferentially aligned with the discontinuous row of teeth on the planetary shaft high-speed gear for the plurality of second planetary shaft first rotor drive gears, and a circumferential gap separating the discontinuous row of teeth on the planetary shaft low-speed gear for the plurality of second planetary shaft second rotor drive gears and circumferentially aligned with the discontinuous row of teeth on the planetary shaft high-speed gear for the plurality of second planetary shaft second rotor drive gears.

In accordance with a further feature, an embodiment of the present invention also includes equidistant gap arc lengths respectively defined by the circumferential gaps for each of the planetary shaft low-speed gears for the plurality of first planetary shaft first rotor drive gears, the plurality of first planetary shaft second rotor drive gears, the plurality of second planetary shaft first rotor drive gears, and the plurality of second planetary shaft second rotor drive gears, wherein each of the equidistant gap arc lengths are equal to equidistant arc lengths defined by the planetary shaft high-speed gears for the plurality of first planetary shaft first rotor drive gears, the plurality of first planetary shaft second rotor drive gears, the plurality of second planetary shaft first rotor drive gears, and the plurality of second planetary shaft second rotor drive gears.

In accordance with a further feature of the present invention, the first and second rotors are of a triangular shape and have a smooth continuous circumferential surface surrounding a perimeter of the first and second rotors.

In accordance with a further feature, an embodiment of the present invention also includes the stator housing having a front plate, a rear plate, and a center housing flanked and coupled to the front and rear plates on respective opposing ends of the center housing and defining, with the front and rear plates, the combustion chamber.

In accordance with an additional feature of the present invention, the first and second rotors are made of a material composition of aluminum alloy with approximately 75% aluminum and 15% silicon.

In one beneficial embodiment of the present invention, an intake valve formed on the stator housing may be electronically controlled to control the air charge admitted during the intake cycle replacing the throttle body. Therefore, the intake manifold operates at near normal atmospheric pressure, contrasted with the partial vacuum found in conventional engines. As the rotor pivots during each cycle, the change in combustion chamber volume per degree of output shaft revolution is a constant value. This is unlike a piston engine where the reciprocating motion of the piston and its rod are constantly changing velocity. Therefore, the uniform volume rate of change for the present invention allows the Atkinson cycle to extend far beyond the practical limits of a piston engine. Designs of the present invention have been shown to achieve a 75% reduction in compression ratio.

Additionally, in a conventional four-cycle internal combustion engine it takes two full revolutions for each cylinder to complete its four cycles. Engine timing is communicated to a control module through a sensor. When calibrated, the control module determines when the piston is at top dead center in cylinder number one. However, this condition occurs twice during the 4 cycles. The valve cam shaft only completes one full revolution during the engine's four cycles and the control module needs to know the cam shaft's position to properly time the ignition and fuel injection. The control module has a second input sensor that rotates with the cam shaft. With these two sensor inputs, the control determines when cylinder number one is at top dead center at the transition from the compression cycle to the power cycle. With the base point determined, the control module determines the RPM and estimates the time to inject fuel and ignite each cylinder. In other portions of the control, valve timing/duration is computed, and command signals are issued to actuators in the engine. With that context, one goal of the present invention is to provide a rotary engine with electronically controlled valving, wherein there is no mechanical relationship between the valves and the output shaft. A sensor on the output shaft can be used to determine when the rotor is at the equivalent of top dead center in combustion chamber number one. When this first occurs, the valve state is undetermined. However, the control module can simply declare this to be the transition from compression and power cycles and begin issuing valve commands accordingly.

Additionally, purely electronic valve controls provide several additional control situations that are possible with the present invention. If the valve travel does not interfere with the rotor in it pivoting, the intake valve can be let open without harm. This can be useful during engine starts when all intake valves are left open until a nominal RPM is reached. At this stage, with the intake manifold at nominal atmospheric pressure, air can freely enter or leave the combustion chambers as the rotors pivot. With four combustion chambers alternately filling and emptying air, and because the change in chamber volume per degree of shaft rotation is identical whether emptying or filling, the net movement of air into the intake manifold will be zero. During this free-wheeling operation, fuel injection would be cut off to prevent engine flooding. Once the desired RPM is achieved, the intake and exhaust valve actions can resume as the fuel injection and ignition are implemented.

The present invention also considers fail-safe/fail-operative conditions. The power output of each combustion chamber can be verified by monitoring its exhaust temperature. If a single cylinder has been determined to have low or no power output, the control can declare the malfunction and deactivate fuel injection and ignition spark while holding the respective intake valve open. While the engine may have lower potential power output, in automotive applications, engines rarely operate near maximum power. The remaining three combustion chamber power output can be increased to make up for this lost power. In an aviation application, the engine will be operating near its maximum power. The loss of a single combustion chamber will result in a loss of available power; however, the remaining power will allow a safe descent and landing for service. Holding the one intake valve open will allow for minimal parasitic power loss.

The present invention also provides for addressing a third situation that is prevalent in hybrid engine applications, where there are frequent transitions from purely electric power to mixed electric/combustion power to sole combustion power operation. In these situations, frequent activations/deactivations will be facilitated. A fourth situation is in aviation applications. As an aircraft ascends, the air density drops so the available oxygen available for combustion diminishes and the engine's ability to generate power is reduced. For example, the density of air at 18,000 feet is one half that of sea level. To overcome this, engine makers add turbochargers to compress air before it enters the combustion chambers. These designs come in two versions, turbo-normalized operation, and turbo-boost operation. Turbo-normalized operation supplies the engine with equivalent to sea level atmospheric pressure to a standard aircraft engine. This allows the engine to produce full rated power at altitude. Turbo-boosted engines can see intake manifold pressures more than one atmosphere, increasing the power that can be produced. This increase in power requires strengthening of the engine internals and shortens the expected interval between overhauls. In either form, the turbocharger's equipment increases weight, cost, and maintenance.

For a rotary engine with electronically controlled valves operating in an Atkinson cycle, like the present invention, nominal power can be designed so that significant intake air is expelled back into the intake manifold before the intake valve closes. As higher altitude is reached and density is reduced, the intake valve can be closed earlier in the compression cycle increasing the effective compression ratio. By effectively doubling the compression ratio, rated engine power can be maintained up to 18,000 feet without adding weight or equipment. Again, power management would be controlled electronically. Additionally, the axial width of the rotor is essentially an unconstrained design variable of the present invention. As the variable is exercised, the displacement and the range of available compression ratios are changed. The width of the rotors need to be increased for the "normalization" capability. For example, a 5.02 cm rotor width generates a 500 cc displacement. At maximum power, the intake valve closes at the beginning of the compression cycle, or 0 degrees of pivot. The compression ratio is defined by the cavity volume in the stator. For the exemplar design this compression ratio is 11.5:1. At ground level the atmospheric pressure is a nominal 1 bar and at peak compression before combustion, the chamber charge is compressed to 11.5 bar.

The process of combustion increases the temperature and pressure of the working fluid within the chamber. Pressure exerts a torque upon the rotor as previously described. As the rotor approaches 60° of pivot in the power cycle as discussed further herein, the chamber pressure and temperature are still elevated, e.g., approximately 7 bar. The valve mechanism must overcome the residual pressure on the face of the exhaust valve. The remaining pressure escapes through the exhaust port and represents a significant efficiency loss. This inefficiency is inherent an Otto Engine Cycle. If the Otto Cycle Engine is supplanted with a turbocharger or supercharger, the end of power cycle pressures are even greater increasing efficiency losses.

For a "normalized" aircraft engine, the rotor width for the above-referenced example would be doubled to 10.04 cm generating 1000 cc of displacement. At the same time the maximum compression ratio increases to 23:1. This compression ratio at ground level would lead to detonation and/or dieseling. This is where the offset in closing the intake valve compensates by delaying its closing until 30° of the 60° pivot. At that point displacement is only the 500 cc design into the automotive engine. Delaying the valve closing also only produces the 11.5:1 compression ratio. Thus, the power generated in the power cycle matches the power in the automotive design.

With the wider rotor, the change in displacement per degree of pivot is also twice as great as the automotive design. The instantaneous torque generated at the onset of combustion is twice as high but diminishes twice as fast. After 30° of pivot the displacement is back to 500 cc (the same as the automotive design at 60° of pivot). Thus, the chamber pressure will still be at some 7 bar. It is at this time additional work can be performed, between 30-60° of the power cycle. It is estimated that the chamber pressure will be further reduced to approximately 2 bar at the 60° pivot point when the exhaust valve opens. This additional power extraction is unique to this design.

Considering the above-referenced operation 18,000 feet altitude. The outside air pressure will be at a nominal 0.5 bar. In this operating regime, the intake valve closes at 0° pivot entraining 1000 cc of air at 0.5 bars of pressure. At the same time, compression ratio has been increased to 23:1. So at the end of the compression cycle, the combustion chamber pressure becomes 0.5 bar times 23:1 compression resulting in 11.5 bar pressure. The oxygen content and potential power are thus identical to both the automotive design and aircraft design at ground level.

The pressures, temperatures and power during the power stroke are identical to full power at ground level. Stresses on the engine are also identical. The extra power available between 30-60° of pivot is also still available. The only adverse effect is an increased pressure differential on the face of the exhaust valve. (2 bar against 0.5 bar compared to 2 bar against 1 bar at ground level). Turbocharging, however, recoups some of the power normally lost through the exhaust. That said, turbocharging is inferior due to inefficiencies, complexity, cost and weight. Therefore, benefits associated with the present invention include easing of design constraints on rotor width and the uniform change in volume per degree of pivot, which is necessary to extend the range of valve timing and compression ratio and also achieves "normalized" operation without increases in complexity or significant cost. Additional benefits include efficiency of the design by widening of the rotor, which exceeds both Otto cycle engines and Atkinson cycle engines utilizing reciprocating pistons. This may be advantageous even for automotive applications. Further benefit of the present invention includes the electronic control with the ability to maximize power potential from a variety of fuels without suffering detonation, accomplished by adjusting the maximum compression ratio to match the capability of the fuel.

Although the invention is illustrated and described herein as embodied in a rotary engine design, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Another goal of the present invention is to provide time parameters associated with the rotary engine. Specifically, there are several timing parameters to be optimized in any internal combustion engine. Among these are valve timing, fuel management, ignition timing, RPM, and power demand. Before the advent of computer controls, these parameters were defined mechanically that limited the effective operating regimes. Modern computer controls can sense operating conditions and dynamically adjust performance factors to compensate for real world conditions. However, many of the control mechanisms and sensors are legacy designs and limited in their range of effectiveness. Several parameters can have multiple solutions to achieve the desired result. For example, the same power output can be generated over a range of RPMs. Determining which RPM for a given power demand may be a complex problem including several parameters. Other parametric relationships are more constant such as stoichiometric fuel ratio. An engine control system with purely electronic controls will have a wider range of authority over an engine restricted by mechanical constructs. The computer's ability to process multiple sensors will facilitate strategies for fail-safe and fail-operative modes. Key to realizing the benefits of a purely electronic controls is the ability to finely control the variables in the combustion process. Control strategies can be affected by varying magnitude or adjusting the time and/or duration of a fixed magnitude.

In a conventional engine the throttle body or carburetor is a magnitude type control by reducing the pressure in the intake manifold. The throttle plate may be mechanically linked to the accelerator pedal. In later designs the computer control system may operate the throttle plate via a servo mechanism. In the former, the computer must observe the conditions set by the throttle and attempt to optimize other parameters. In the latter, the accelerator pedal is not physically connected to the engine and an electrical signal is generated and sent to the control system as a statement of desired power output. Ignition and fuel management are already fully controlled by timed electronic means. Current valve timing duration are primarily mechanical systems with limited authority. The present invention provides a rotary engine with purely electronic valve controls may be controlled by timing and/or magnitude (by varying valve lift). This would allow all engine control parameters to be solely timed from a digital sensor on the output shaft. A sensor with multiple detectors can easily generate a high-resolution clocking register. An 8-bit clock register could resolve output shaft angle down to 128 positions. Each rotor pivot movement spans 60 degrees and drives the output shaft 180 degrees. Thus a 60-degree pivot will change the register value by 64 positions. The 8th bit of the register would account for the two full revolutions required for 4 cycle operation. In such a system, the control system would define values for control action triggers. For example, one value would be assigned to open the number 1 intake valve. As the register count reaches the assigned value, a comparator circuit would trigger and send the appropriate output command. This method would greatly reduce the computational power required to execute the various commands. Atkinson cycle specifies the closing of the intake valve. Since the intake manifold and combustion chamber pressure at that moment will be nominal atmospheric pressure, the valve closer trigger value can be used to indicate the oxygen present. The CPU can calculate the amount of fuel needed for a stoichiometric mixture.

Similarly, the register's input clock signal from the output shaft sensor determines the current RPM. The velocity of the flame front during ignition is relatively constant. As the RPM varies, the time to initiate ignition must adjusted to account for this interval. The ignition trigger value would be adjusted to advance the ignition timing to account for the flame front delay. It should be noted that the event trigger values can be maintained/adjusted at any time without regard to the actual output shaft position. Once a trigger value is changed, it will become effective the next time the output shaft position register matches the new trigger value.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the output shaft or as it spans through the stator housing and combustion chamber(s).

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 2:
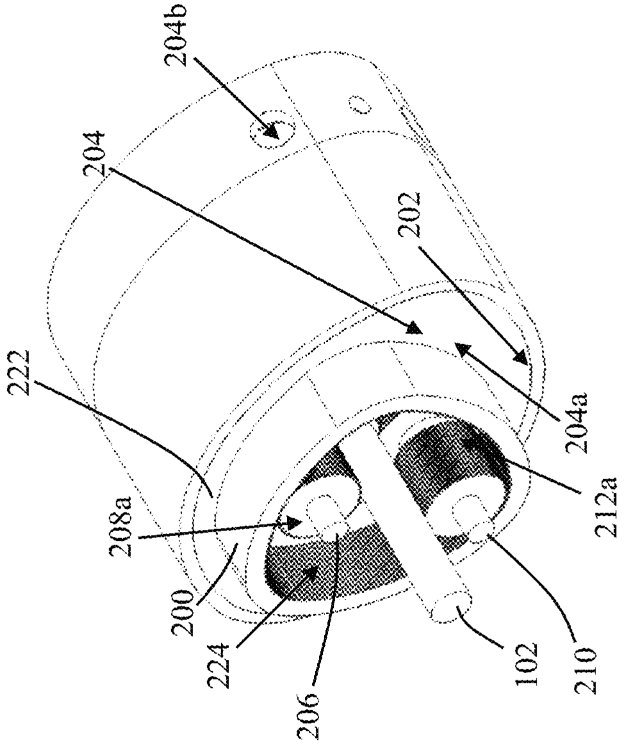
FIGS. 2-7 are fragmentary perspective views of the rotary engine in FIG. 1 with the stator housing partially removed.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient rotary engine 100 with dual axis rotor rotation and that is configured to utilize computer-controlled valves and fuel injection generating a more balanced and leightweight rotary engine assembly than known rotary engine assemblies. Referring now to FIGS. 1-11, one embodiment of the present invention is shown in a perspective views. The figures herein show several advantageous features of the present invention, but, as will be described below, the invention can be provided in several shapes, sizes, combinations of features and components, and varying numbers and functions of the components. The first example of a rotary engine 100, as shown, includes a stator housing 101 that is preferably of substantially rigid material capable of withstanding readily ascertainable combustion temperatures and that includes an inner wall surface 202 defining a combustion chamber 204. The stator housing 101 may also consider of two stators each defining a combustion chamber 204*a-b* that experiences a complete combustion cycle, or the four portions of the combustion cycle, i.e., intake, compression, combustion, and exhaust. The stator housing 101 may include a front plate (or endcap/outer stator) 104, a rear plate 106, and a center housing 108 (or stator) flanked and coupled to the front and rear plates 104, 106 on respective opposing ends of the center housing 108 and defining, with the front and rear plates 104, 106, the combustion chamber 204. In preferred embodiments, a center plate 222 is coupled to the inner wall surface 202 of the stator housing 101 to bifurcate the combustion chamber 204 into the two separate independent combustion chambers 204*a-b*. The assembly 100 is beneficially formed in contrast to a Wankel design that suffers from temperature imbalance between the intake, combustion, and exhaust portions of the stator castings. The design of the combustion chamber 204, also described in more detail below, does not have an extreme elongated shape like known assemblies like the Wankel and allows for complete combustion before the exhaust cycle.

More specifically, the assembly 100 includes a first rotor 200 and a second rotor 500 that are preferably each of a triangular shape. Each of the rotors 200. 500 are disposed within the combustion chamber 204. When the combustion chamber 204 is bifurcated into two combustion chambers 204*a-b*, the rotor 200 will be disposed in the first combustion chamber 204*a* and the rotor 500 will be disposed in the second combustion chamber 204*b*. The rotors 200, 500 may have three convex surfaces that create seals with the inner wall surface 202 during a 360° rotation of the rotors 200, 500 within the stator housing 101 and are fabricated utilizing the process described herein. The rotation of the rotors 200, 500 may be considered to be the equivalent to a Wankel's apex seals, in that the seal is only generated by a rubbing motion of the apex of two converging lobes in a single direction, i.e., there is always a positive radius of curvature. The rotors 200, 500 never contact the inner wall surface 202 except at the equivalent apex seal configuration. This is in stark contrast to rotor engines that have a retrograde motion and varying angles of contact that lead to high wear issues and ring seals in a piston engine that are pushed down.

The profiles of the rotors 200, 500 and inner surface 202 of the stator housing facilitate in generating a uniform displacement rate change through all four cycles of the combustion process because of the constrained rotor motion. The uniform displacement rate change maintains efficient leverage throughout the power stroke (as opposed to the varying crank angles in a reciprocating engine), extends the effective range available for the Atkinson valve timing, and allows extended precise control of the oxygen admitted for each combustion cycle.

More specifically, the engine 100 with dual axis rotor rotation includes a first rotor 200 disposed within the combustion chamber 205 and defines a first rotor cavity 204 that is enclosed and includes three lobes. Said another way, the rotors 200, 500 are configured with three convex surfaces defining apexes that, when moved around the inner wall surface 202 of the stator housing 101 during the complete combustion cycle, seal and form the four portions of the combustion cycle. The rotors 200, 500 are beneficially formed utilizing a fake circle methodology (as discussed in detailed herein) and may have a smooth continuous circumferential surface surrounding a perimeter of the first and second rotors 200, 500. In one embodiment, the rotors 200, 500 are made with a substantial rigid material, e.g., a material composition of aluminum alloy with approximately 75% aluminum and 15% silicon (78% Al, 17% Si and may be made without hard coating and results in a 75% weight reduction compared to a steel rotor).

Similarly, the second rotor 500 is disposed within the combustion chamber 204 and also defines a second rotor cavity 502 that is enclosed. The first and second rotors 200,

500 are beneficially configured with gears such that they pivot around dual axes in a counterclockwise direction 180° out of phase with one another. Therefore, said movement generates horizontal and vertical counterbalance that beneficially does not require any counterweights typically utilized with known rotary engines. Moreover, the movements of the components in the assembly 100 are different than known piston engines in that the movements are in a single direction, thereby increasing the longevity of the components utilized in the assembly 100.

The output shaft 102 may be rotatably coupled to the stator housing 101 and is operably configured to rotate in a clockwise direction. The output shaft 102 is operably coupled to the gears described herein and there are no eccentric elements in the output shaft; rather, the only eccentric movement in the assembly 100 is the rotor rotation. Said differently, outside of the rotors 200, 500, all other active components rotate and balanced around their respective axis of rotation. The output shaft 102 can be seen disposed in the first rotor cavity 224 and the second rotor cavity 502 and has a first plurality of first rotor drive gears 300*a-b* and a second plurality of second rotor drive gears 300*c-d* each fixedly coupled to the output shaft 102, e.g., with welding, injection molding, fasteners, etc. The first and second plurality of second rotor drive gears 300*a-d* have one set of gears 300*a*, 300*d* with the same radius and another set of gears 300*b*, 300*c* with the same radius. The radiuses of the gears 300*a*, 300*d* are less than the radiuses of gears 300*b*, 300*c*.

Figure 7:
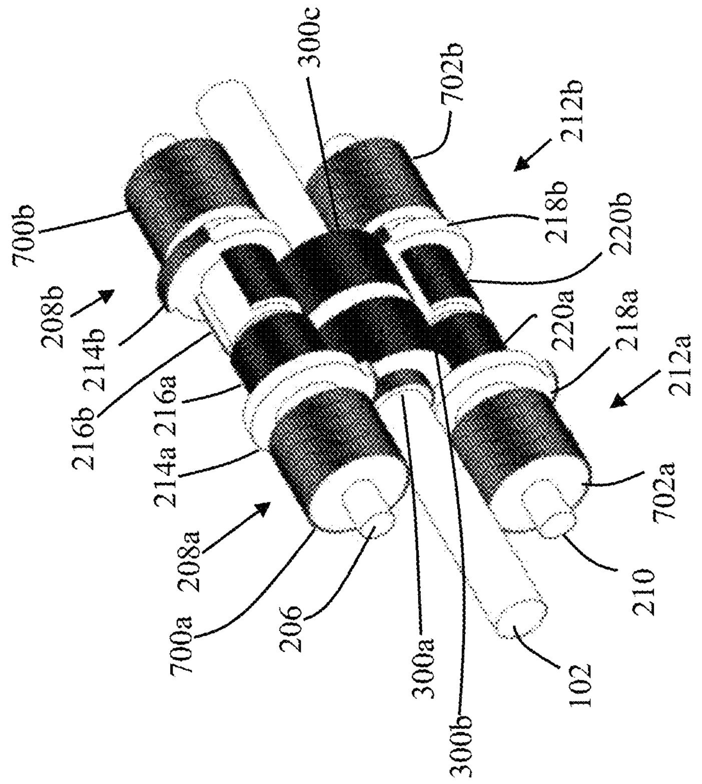
Figure 10:
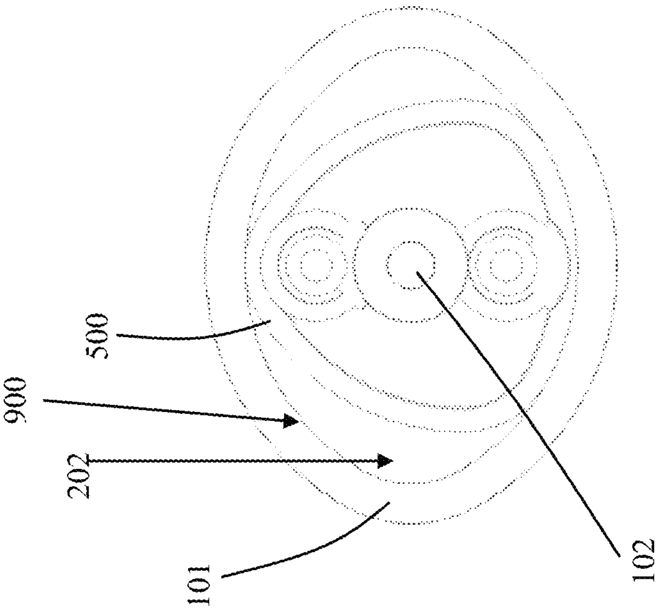
FIGS. 9-10 are fragmentary perspective and front elevational views, respectively, of the stator and two planetary gear sets, and drive gears on the output shaft in accordance with one embodiment of the present invention.

The first planetary shaft 206 and the second planetary shaft 210 are coupled to the stator housing 101 in a stationary configuration, i.e., they do not rotate, and the gears coupled thereto are configured to freely rotate thereon. The first and second planetary shafts 206, 210 are disposed in the first and second rotor cavities 224, 502 and each flank and are disposed in parallel configuration or orientation to the output shaft 102. As best seen in FIG. 7, the assembly 100 includes a first planetary gear set 208*a* axially disposed on, and operably configured to freely rotate on, the first planetary shaft 206, in addition to a second planetary gear set 208*b* axially disposed on, and operably configured to freely rotate on, the first planetary shaft 206. The planetary gear sets described herein may be an integral monolithic component and/or is unitary such that they are one single piece or operate as one single piece. In other embodiments, they are separate components. As seen in the figures, the first and second planetary gear sets 208*a-b* are configured on the first planetary shaft 206 in a symmetrically inverted configuration (i.e., 180° rotated) relative to a plane interposed between two low speed gears 216*a-b* in the sets 208*a-b*. The first planetary gear set 208*a* includes a first shaft first rotor planetary rotor gear 700*a* operably couplable to the first rotor 200 (i.e., the gear is configured to drive, directly couple with, and mate with the rotor 200 when the assembly is in operation, but not necessary contact with the rotor during a complete combustion cycle). The first planetary gear set 208*a* also includes a plurality of first planetary shaft first rotor drive gears 214*a*, 216*a* operably couplable to the first plurality of first rotor drive gears 300*a-b* and each having a different radius to one another. Each of the rotor planetary rotor gears 700*a-b*, 702*a-b* may have a radius of 30 mm and a gear thickness of 5.02 cm, wherein the gear thickness 5.02 may correspond, e.g., be equal to, the thickness of the rotors 200, 500.

Similarly, the second planetary gear set 208*b* is axially disposed on, and operably configured to freely rotate on, the first planetary shaft 206, and includes a first shaft second rotor planetary rotor gear 700*b* operably couplable to the second rotor 500. Again, the second planetary gear set 208*b* has a plurality of first planetary shaft second rotor drive gears 214*b*, 216*b* operably couplable to the second plurality of second rotor drive gears 300*c-d*, each having a different radius. To effectuate the balanced rotation of the rotor, a second planetary shaft 210 is coupled to the stator housing 101 in a stationary configuration, disposed in the first rotor cavity 224 and the second rotor cavity 502, and is also flanking and parallel to the output shaft 102. The second planetary shaft 210 also has a first and a second planetary gear set 212*a-b* that are axially disposed on, and operably configured to freely rotate on, the second planetary shaft 210. The first second planetary gear set 212*a* also includes a second shaft first rotor planetary rotor gear 702*a* operably couplable to the first rotor 200, and with a plurality of second planetary shaft first rotor drive gears 218*a*, 220*a* operably couplable to the first plurality of first rotor drive gears 300*a-b*, each being of a different radius. The plurality of second planetary shaft first rotor drive gears 218*a*, 220*a* are beneficially operably configured (again, when the rotor is in operation) to be in phase with the plurality of first planetary shaft first rotor drive gears 214*a*, 216*a*. The second planetary gear set 212*b* includes a second shaft second rotor planetary rotor gear 702*b* operably couplable to the second rotor 500, and with a plurality of second planetary shaft second rotor drive gears 218*b*, 220*b* operably couplable to the second plurality of second rotor drive gears 300*c-d*, each being of a different radius. The plurality of second planetary shaft second rotor drive gears 218*b*, 220*b* are also beneficially operably configured to be in phase with the plurality of second planetary shaft first rotor drive gears 214*b*, 216*b*. The first and second planetary gear sets 208*a-b*, 212*a-b* on the respective first and second planetary shafts 206, 210 are operably configured to generate a dual axis, eccentric, counterclockwise, and out-of-phase rotation for the first and second rotors 200, 500 that accomplished the balanced and efficient complete combustion cycle described herein.

Still referring to FIG. 7, the first planetary gear set 208*a* on the first planetary shaft 206 can be seen to be axially aligned with the second planetary gear set 208*b* on the first planetary shaft 206, i.e., they rotate about the same axis defined by the shaft 206. Similarly, the first planetary gear set 212*a* on the second planetary shaft 210 is axially aligned with the second planetary gear set 212*b* on the second planetary shaft 210. To effectuate the balanced configuration of the assembly 100, the first planetary shaft 206 and the second planetary shaft 210 are disposed in a parallel configuration with one another.

The gear sets 208-*b*, 212*a-b* have specially configured gears thereon to engage with drive gears 300*a-d* coupled to the output shaft 102. Specifically, the first plurality of first rotor drive gears 300*a-b* may have a first rotor high-speed drive gear 300*a* defining a radius 1100 (depicted in FIG. 11) and a first rotor low-speed drive gear 300*b* defining a radius 1102 greater than the radius 1100 of the first rotor high-speed drive gear 300*a* for the first plurality of first rotor drive gears 300*a-b*. To demonstrative and exemplary purposes, all radius described herein will be considered a "reference" or "pitch" radius, i.e., the length where teeth of the gear will operate or mesh with an opposing gear. In other embodiments, the radius may be the root radius or tip radius. The radius 1102 may be 20 mm for the first and second rotor high-speed drive gears 300*a*, 300*d* and said gears may be a gear thickness of 10 mm. The terms "low", "high" and "speed" are not to be given any specific or limited meaning unless otherwise explicitly stated herein and utilized for naming nomenclature. That said, the term "high-speed" is generally in reference to the rotational speed of the output shaft 102. The first and second rotor low-speed drive gears 300*b-c* may be 36 mm and have a gear thickness of 40 mm. Like other gears utilized in the assembly 100, ball bearing may be beneficially utilized to space and/or retain the gears in their respective configurations and enable a low-friction rotation of the gears.

As exemplified above, the second plurality of second rotor drive gears 300*c-d* have a second rotor high-speed drive gear 300*d* defining a radius equal to the radius of the first rotor high-speed drive gear 300*a* for the first plurality of first rotor drive gears 300*a-b*. The second plurality of second rotor drive gears 300*c-d* also have a second rotor low-speed drive gear 300*c* defining a radius greater than the radius of the second rotor high-speed drive gear 300*d* for the second plurality of second rotor drive gears 300*c-d* and equal to the radius of the first rotor low-speed drive gear 300*b* for the first plurality of first rotor drive gears 300*a-b*.

Figure 8:
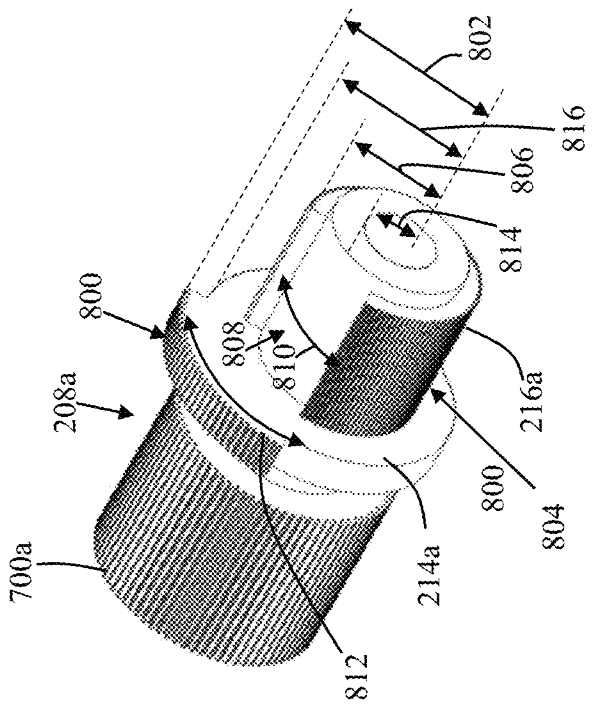
FIG. 8 is a perspective view of a first planetary gear set utilized with the assembly in accordance with one embodiment of the present invention.

With reference to FIGS. 7-8, in one embodiment, the plurality of first planetary shaft first rotor drive gears 214*a*, 216*a* have a planetary shaft high-speed gear (HSG) 214*a* with a discontinuous row of teeth 800, defined circumferentially thereon, and that define a first HSG radius 802. The teeth 800 of the planetary shaft high-speed gear (HSG) 214*a* are operably couplable to the first rotor high-speed drive gear 300*a* for the first plurality of first rotor drive gears 300*a-b*. The plurality of first planetary shaft first rotor drive gears 214*a*, 216*a* also specifically includes a planetary shaft low-speed gear (LSG) 216*a* with a discontinuous row of teeth 804 defining a first LSG radius 806 less than the first HSG radius 802 defined by the planetary shaft high-speed gear 214*a* on the plurality of first planetary shaft first rotor drive gears 214*a*, 216*a*. The teeth 804 of the planetary shaft low-speed gear 216*a* are operably couplable to the first rotor low-speed drive gear 300*b* on the first plurality of first rotor drive gears 300*a-b*.

Similarly, the plurality of first planetary shaft second rotor drive gears 214*b*, 216*b* have a planetary shaft high-speed gear 214*b* with a discontinuous row of teeth 800 defining a first HSG radius 802 and operably couplable to the second rotor high-speed drive gear 300*d* for the second plurality of second rotor drive gears 300*c-d*. The planetary shaft low-speed gear 216*b* also similarly includes a discontinuous row of teeth 804 defining a first LSG radius 806 less than the first HSG radius 802 defined by the planetary shaft high-speed gear 214*b* on the plurality of first planetary shaft second rotor drive gears 214*b*, 216*b* and operably couplable to the second rotor low-speed drive gear 300*c* on the second plurality of second rotor drive gears 300*c-d*. The plurality of second planetary shaft first rotor drive gears 218*a*, 220*a* also has a planetary shaft high-speed gear 218*a* with a discontinuous row of teeth 800 defining a first HSG radius 802 and operably couplable to the first rotor high-speed drive gear 300*a* for the first plurality of first rotor drive gears 300*a-b*. The planetary shaft low-speed gear 220*a* has a discontinuous row of teeth 804 defining a first LSG radius 806 less than the first HSG radius 802 defined by the planetary shaft high-speed gear 218*a* on the plurality of second planetary shaft first rotor drive gears 218*a*, 220*a* and is operably couplable to the first rotor low-speed drive gear 300*b* on the first plurality of first rotor drive gears 300*a-b*. The plurality of second planetary shaft second rotor drive gears 218*b*, 220*b* also includes a planetary shaft high-speed gear 218*b* with a discontinuous row of teeth 800 defining a first HSG radius 802 and operably couplable to the second rotor high-speed drive gear 300*d* for the second plurality of second rotor drive gears 300*c-d*. The planetary shaft low-speed gear 220*b* also has a discontinuous row of teeth 804 defining a first LSG radius 806 less than the first HSG radius 802 defined by the planetary shaft high-speed gear 218*b* on the plurality of second planetary shaft second rotor drive gears 218*b*, 220*b* and is operably couplable to the second rotor low-speed drive gear 300*c* on the second plurality of second rotor drive gears 300*c-d*.

In one exemplary embodiment, the planetary shaft low-speed gears 216*a-b*, 220*a-b* may have a thickness of 20 mm and have a LSG radius 806 of 24 mm. Each of the planetary shaft low-speed gears 216*a-b*, 220*a-b* may define a circumferential gap 808 separating the discontinuous row of teeth 804. For example, the gap 808 on the planetary shaft low-speed gear 216*a* may also be circumferentially (and radially) aligned with the discontinuous row of teeth 800 on the planetary shaft high-speed gear 214*a* for the plurality of first planetary shaft first rotor drive gears 214*a*, 216*a*. The circumferential gap 808 separating the discontinuous row of teeth 804 on the planetary shaft low-speed gear 216*b* for the plurality of first planetary shaft second rotor drive gears 214*b*, 216*b* may also be circumferentially aligned (and radially) with the discontinuous row of teeth 800 on the planetary shaft high-speed gear 214*b* for the plurality of first planetary shaft second rotor drive gears 214*b*, 216*b*. Similarly, the circumferential gap 808 separating the discontinuous row of teeth 804 on the planetary shaft low-speed gear 220*a* for the plurality of second planetary shaft first rotor drive gears 218*a*, 220*a* may be circumferentially aligned with the discontinuous row of teeth on the planetary shaft high-speed gear 218*a* for the plurality of second planetary shaft first rotor drive gears 218*a*, 220*a*. The circumferential gap 808 separating the discontinuous row of teeth 804 on the planetary shaft low-speed gear 220*b* for the plurality of second planetary shaft second rotor drive gears 218*b*, 220*b* is also circumferentially aligned with the discontinuous row of teeth 800 on the planetary shaft high-speed gear 218*b* for the plurality of second planetary shaft second rotor drive gears 218*b*, 220*b*. Said differently, the gap arc length 810 may be same arc length as the arc length 812 for the teeth 800. The radius 814 spanning from the center axis to the bottom of the gap 808 or bottom edge of the teeth 804 may be 19 mm. The width of the planetary shaft low-speed gears 216*a-b*, 220*a-b* may be 40 mm.

In one embodiment, each of the gap arc lengths 810 are equidistant to one another. Said differently, the equidistant gap arc lengths 810 are respectively defined by the circumferential gaps for each of the planetary shaft low-speed gears 216*a-b*, 220*a-b* for the plurality of first planetary shaft first rotor drive gears 214*a*, 216*a*, the plurality of first planetary shaft second rotor drive gears 214*b*, 216*b*, the plurality of second planetary shaft first rotor drive gears 218*a*, 220*a*, and the plurality of second planetary shaft second rotor drive gears 218*b*, 220*b*. Each of the equidistant gap arc lengths 810 are equal to equidistant arc lengths 812 defined by the planetary shaft high-speed gears 214*a*, 214*b*, 218*a*, 218*b* for the plurality of first planetary shaft first rotor drive gears 214*a*, 216*a*, the plurality of first planetary shaft second rotor drive gears 214*b*, 216*b*, the plurality of second planetary shaft first rotor drive gears 218*a*, 220*a*, and the plurality of second planetary shaft second rotor drive gears 218*b*, 220*b*.

In one embodiment, the radius 802 for each of the planetary shaft high-speed gears 214*a-b*, 218*a-b* is 46 mm and the radius 816 for the portion of the planetary shaft high-speed gears 214*a-b*, 218*a-b* is 35 mm, wherein the radius 816 for the circumferential surface without any gears thereon may uniformly span around the perimeter where the teeth 800 are not disposed.

Figure 1:
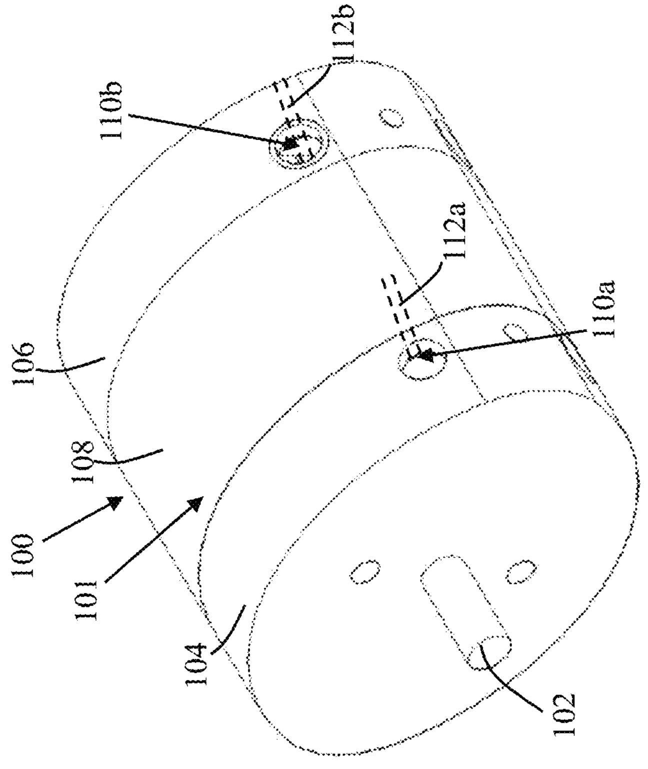
FIG. 1 is a perspective view of a rotary engine with dual axis rotor rotation in accordance with one embodiment of the present invention.
Figure 4:
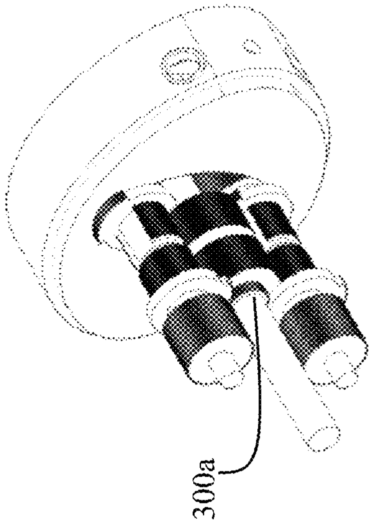
Figure 3:
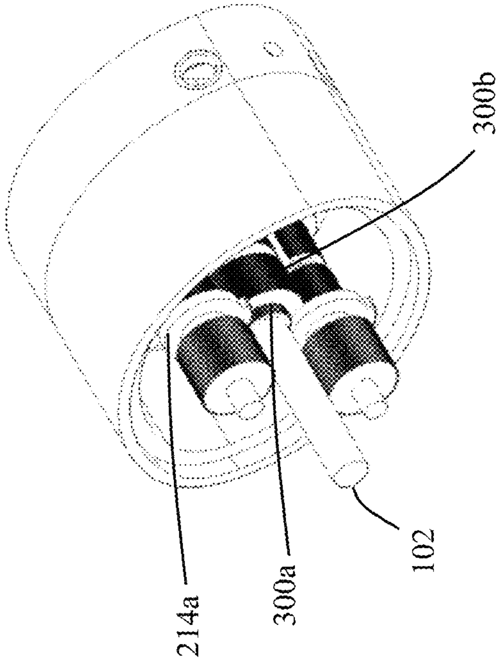

With reference to FIGS. 1-2 and FIG. 7, the assembly 100 may utilize a center plate 222 coupled to the inner wall surface 202 of the stator housing 101, wherein the center plate or wall is interposed between the plurality of first planetary shaft first rotor drive gears 214*a*, 216*a* and the plurality of first planetary shaft second rotor drive gears 214*b*, 216*b*, between the plurality of second planetary shaft first rotor drive gears 218*a*, 220*a* and the plurality of second planetary shaft second rotor drive gears 218*b*, 220*b*, and interposed between the first plurality of first rotor drive gears 300*a-b* and the second plurality of second rotor drive gears 300*c-d* to generate. The configuration of the center plate 222 generates a first combustion chamber 204*a* with the first rotor 200, the plurality of first planetary shaft first rotor drive gears 214*a*, 216*a*, the plurality of second planetary shaft first rotor drive gears 218*a*, 220*a*, and the first plurality of first rotor drive gears 300*a-b* disposed therein and a second combustion chamber 204*b* with the second rotor 500, the plurality of first planetary shaft second rotor drive gears 214*b*, 216*b*, the plurality of second planetary shaft second rotor drive gears 218*b*, 220*b*, and the second plurality of second rotor drive gears 300*c-d*.

The center plate 222 bifurcates the combustion chamber 204 and inhibits or prevents gases from passing over through the first and second combustion chambers 204*a-b*. Additionally, the plurality of first planetary shaft first rotor drive gears 214*a*, 216*a* and the plurality of second planetary shaft first rotor drive gears 218*a*, 220*a* may be disposed in a rotationally inversely and symmetrical orientation to the plurality of first planetary shaft second rotor drive gears 214*b*, 216*b* and the plurality of second planetary shaft second rotor drive gears 218*b*, 220*b* relative to the center plate 222.

With reference to FIGS. 1-2, FIG. 6, and FIG. 12, the stator housing 101 can be seen defining one or more enclosed spark plug port(s) 110*a-n*, wherein "n" represents any number greater than one. The spark plug port(s) 110*a-n* defined on the housing 101 are fluidly coupled to the first or second combustion chambers 204*a-b*. Specifically, a second enclosed spark plug port 110*b* is defined on the housing 101 and is fluidly coupled to the second combustion chamber 204*b*, wherein the first and second enclosed spark plug ports may have a spark plug 112*a-b* disposed therein.

Similarly, the housing 101 may define one or more enclosed intake port(s) 600 and that are fluidly coupled to either the first or second combustion chambers 204*a-n*. For example, a second enclosed intake port 600 defined on the housing 101 is fluidly coupled to the second combustion chamber 204*b* and the first intake port 600 may be fluidly coupled to the first combustion chamber 204*a*. The first and second enclosed intake ports 600 each have an intake valve 1206 disposed therein.

Additionally, the housing 101 also defines one or more enclosed exhaust port(s) 602 defined thereon and that are fluidly coupled to the first or second combustion chambers 204*a-b*. A first exhaust port 602 may be fluidly coupled to the first combustion chamber 204*a* and a second enclosed exhaust port 600 defined on the housing 101 may be fluidly coupled to the second combustion chamber 204*b*, wherein the first and second enclosed exhaust ports 600 each have an exhaust valve 1206 disposed therein. Beneficially, the spark plug(s) 112*a-b*, exhaust valve(s) 1800, and the intake valve (s) 1206 are communicatively coupled to an electronic controller 2000 (indicated with dashed lines in FIG. 20), wherein the communication may be wired or wirelessly. Electronic control with the electronic controller 2000 over the intake valve timing allows greater range of authority extending available compression ratios accomplishing dynamic control to attain optimal compression ratio based on fuel vapor pressure, atmospheric pressure, temperature and humidity, extending the range of useful fuel blends. Intake valve timing of the present invention also maximizes thermal efficiency achievable without the risk of fuel detonation, and facilitates fail safe/fail operative strategies.

Figure 6:
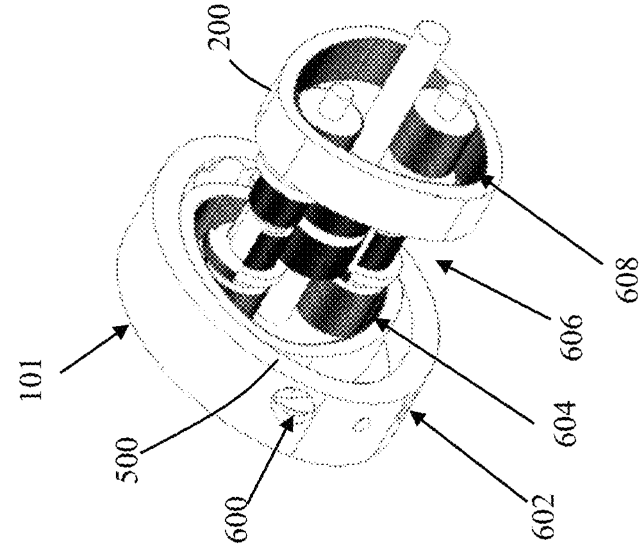
Figure 5:
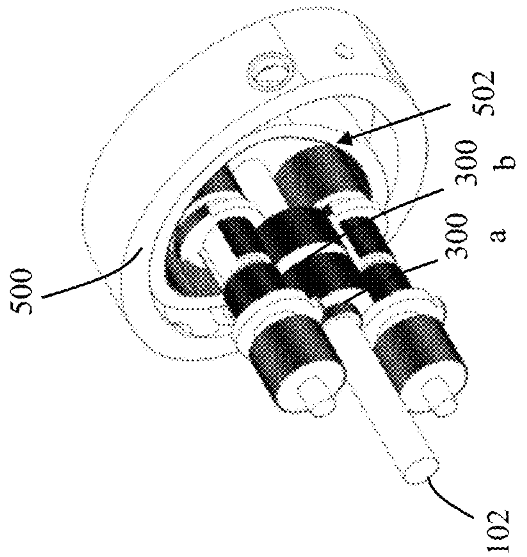
Figure 9:
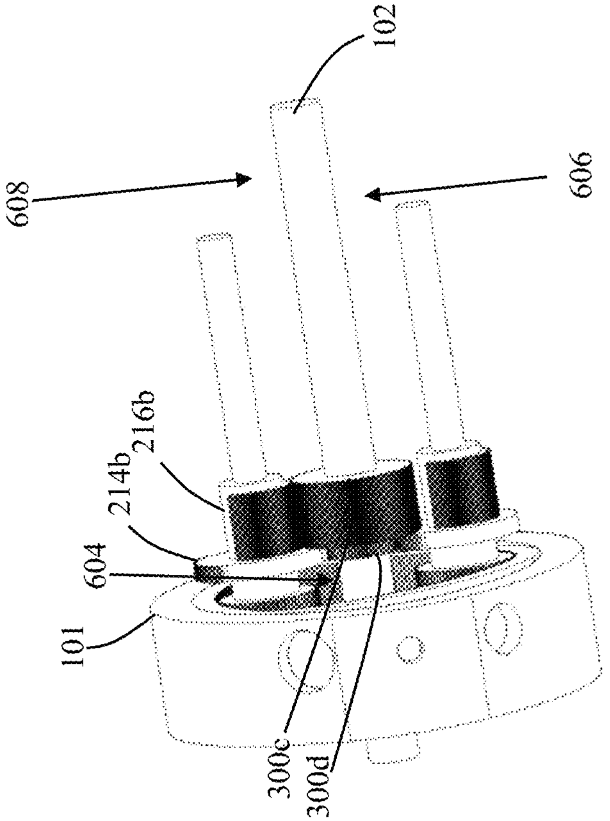
Figure 11:
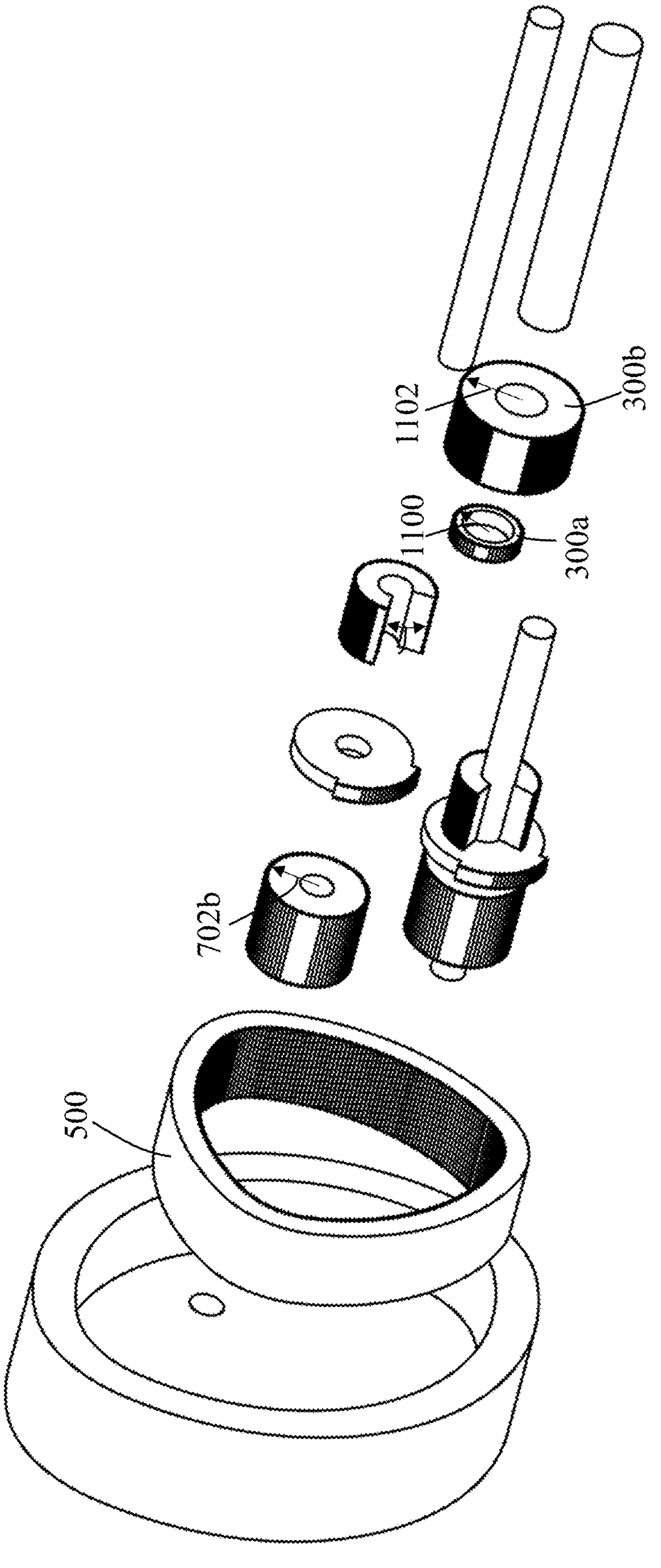
FIG. 11 is an exploded view of the components depicted in FIG. 9.

As best seen in FIGS. 6-7 and FIG. 9, the rotary engine 100 defines three cavities 604, 606, 608 within the engine 100, namely defined by the stator housing 101. The engine cavities 604, 606, 608 are normal to and centered on the output shaft 102. The two outer cavities 604, 608 include the rotors 200, 500, the stator housing 101, and two of the planetary rotor gears 700*a-b*, 702*a-b* operably configured to drive the rotors 200, 500 in the counterclockwise rotation. The center cavity 606 includes the plurality of drive gears 300*a-n* fixedly coupled to the output shaft 102. Each of the planetary rotor gears 700*a-b*, 702*a-b* share a respective common axle between the outer cavities 604, 608. Each of the first and second planetary shafts 206, 210 or axles pass through the center cavity 606. The other gears of the coupling drive gears in the center cavity 606 are also mounted on these planetary axles. The drive gears for the output shaft 102 are disposed in the center cavity 606. As those of skill in the art will appreciate, the output shaft 102 is operably configured to rotate and transfer energy from the rotary engine to a vehicle's wheels through a transmission or other intended use for said energy.

Additionally, rotors 200, 500 have three lobes, wherein the increase in volume between lobe and housing wall 202 creates vacuum pulling fuel/air mixture into housing and/or endplates. In the next cycle, the lobe for a rotor will generate housing wall volume decrease compressing air/fuel mixture for sparking/combustion by sparkplugs 112*a-b*. Next, the volume increases to allow for expansion of gases and the volume decreases again to force gases out through exhaust ports 600, i.e., induction, compression, power, and exhaust, i.e., three power strokes for each lobe of rotor. The rotor follows an eccentric orbit (CCW rotation) that drives output shaft 102 operably coupled to a transmission and/or wheel(s) of a vehicle, or other device.

The gear assemblies 208*a-b*, 300*a-d*, 212*a-n* provides an interrupted gear assemblage that performs 3 functions, i.e., they coordinate the movements of the rotor 200, 500 to maintain a major chord aligned with a bisector of the stator, they maintain the 180° phase difference between the two rotors 200, 500, and they pass torque applied to the rotor during the power cycle to the output shaft 102.

With reference to FIGS. 12-20, cross-sectional views depicting one of the combustion chambers for the rotary engine 100 during a four-cycle operation is depicted. Although FIGS. 12-20 show a specific order of executing the steps in the combustion process, the order of executing the steps may be changed relative to the order shown in certain embodiments. Also, two or more steps shown as occurring in succession may be executed concurrently or with partial concurrence in some embodiments. Certain steps may also be omitted in FIGS. 12-20 for the sake of brevity. In some embodiments, some or all of the process steps included in FIGS. 12-20 can be combined into a single process. While FIGS. 12-20 depict one combustion chamber 204, the other combustion chamber(s) operate in the same or similar manner but with different phasing resulting in a combustion cycle every 180° of the output shaft rotation.

Figure 12:
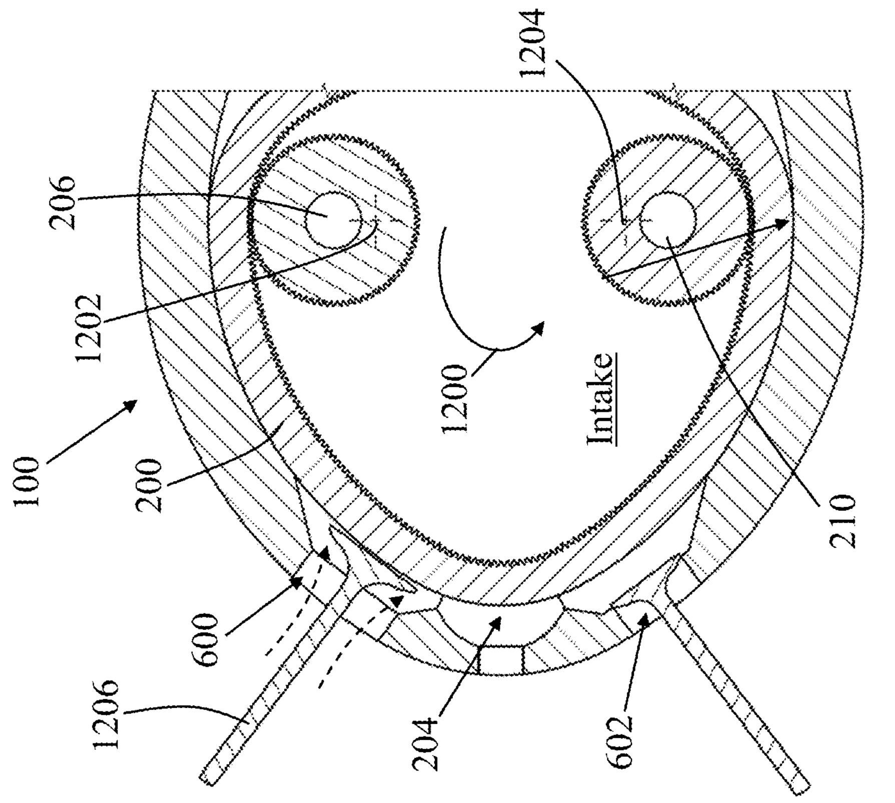
FIGS. 12-20 depict cross-sectional fragmentary views of one combustion chamber of the rotary engine during a four-cycle operation in accordance with one embodiment of the present invention.

Each combustion cycle involves a rotor, e.g., first rotor 200, that moves in a counterclockwise (CCW) rotation during the combustion cycle and about two pivot points (1202, 1204), wherein the CCW rotation is exemplified with arrow 1200 in FIG. 12. With reference to FIG. 2, FIG. 7, and FIG. 12, the rotors 200, 500 rotate 60° in a CCW direction during the combustion cycle around one of two pivot points 1202, 1204. These pivot points 1202, 1204 are imaginary and do not represent a physical restraint of the rotors 200, 500. The physical constraint of the rotors 200, 500 about their motion is effectuated with the stator housing 101 and two planetary gear sets 208*a-b*, 212*a-b* that are freely rotatable on either the first or second planetary shafts 206, 210. Each of the rotors 200, 500 follow an eccentric path within the stator housing 101. The rotors 200, 500 form a "fake circle", i.e., a closed curve constructed such that the maximum chord from any point on the curve is equal to the maximum chord of all other points on the curve. In a true circle, the maximum chord is the diameter that passes through the center. In a fake circle, the maximum chord never passes through the "center." The rotors 200, 500 are of a lower mass and utilize their eccentric motion to generate angular torque through either a high torque coupling gear 214 operatively coupled to a first drive gear 300*a* or a lower toque coupling gear 216*a* operatively coupled to a second drive gear 300*b*. The plurality of drive gears 300*a-b* translate the angular torques to the output shaft 102.

The planetary gear sets 208*a-b*, 212*a-b* each include high and low torque coupling gears (e.g., 214, 216, respectively) that function to maintain the major chord of the rotors 200, 500 on a line that passes through the midline of engine. When a rotor has completed a 60° CCW pivot around one point, the next 60 degrees of CCW pivot occurs around the other pivot point. Rotation of a rotor continues with a center of rotation alternating between the two pivot points or axes that span through said pivot points. For each 60° of rotation, the high and low torque coupling gears on each of the two planetary gear sets 208*a-b* for each of the planetary shafts 206, 210 turn the output shaft 102 180°. The torque coupling gears 214, 216 on the planetary gear sets 208*a-b*, 212*a-b* facilitate in maintaining vertical and lateral position of the rotors 200, 500 so that a major chord is maintained between two seals that separate the stator housing 101 into two combustion chambers.

More specifically, with exemplary reference to FIG. 12, the rotor 200 is depicted in the combustion chamber 204 at its minimum volume. This is equivalent to a piston engine at the top dead center (TDC). This condition occurs at the beginning of the intake cycle. At this position of the rotor 202, the intake valve 1206 is open to the external atmosphere to allow fluid to enter through an intake port 600 in which the intake valve 1206 is operably to be seated when the volume of the combustion chamber 204 increases. The directional flow of fluid can be seen depicted in FIGS. 12-20 with the dashed arrows. The increase in volume of the combustion chamber 204 occurs as the rotors 200, 500 pivot CCW around the upper pivot point 1202, which can be seen exemplified in FIG. 13.

Figure 13:
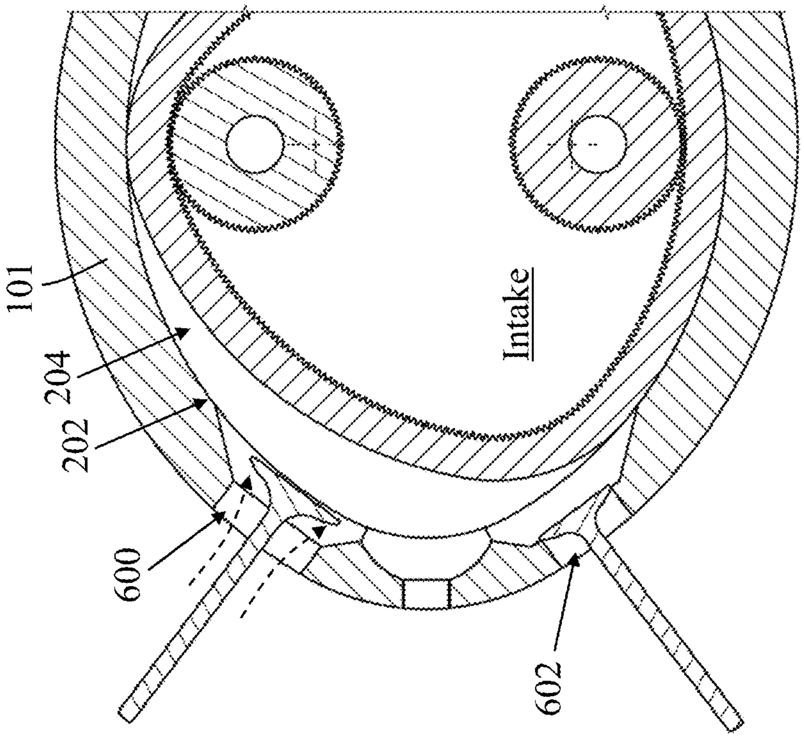

Specifically, FIG. 13 depicts the rotor 200 rotated CCW 20° from the position of the rotor 200 depicted in FIG. 12. Specifically, the intake valve 1206 is still open to permit atmospheric fluid in the intake manifold to flow within the combustion chamber 204. Beneficially, the shape and rotation of the rotor 200 increases the volume of the combustion chamber 204 at a uniform rate throughout the pivot action. Thus, the flow rate across the intake port 600 and any pressure drop therein is constant and dependent on the RPM of the engine. This is an improvement over the piston engine where the piston velocity varies with the crank angle of the shaft.

Figure 14:
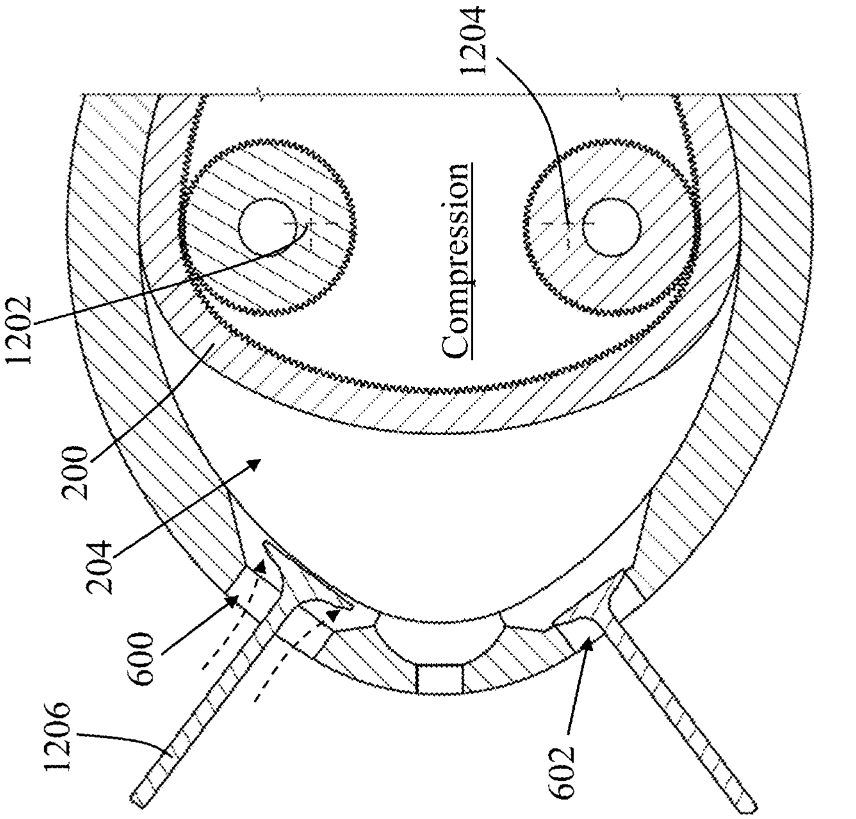

With reference to FIG. 14, the rotor 200 is depicted rotated another 60° relative to the position depicted in FIG. 13. More specifically, the rotor 200 is rotated another 60° CCW from the position depicted in FIG. 13 and about the pivot point 1202. As depicted in FIG. 14, the rotor position within the combustion chamber 204 generates the maximum volume of the combustion chamber 204. This is the equivalent of bottom dead center (BDC) in a piston engine assembly. This condition occurs at the end of the intake cycle and the beginning of the compression cycle. If the engine is performing at maximum power output, the intake valve 1206 will close. At this position, the rotor 200 will begin pivoting CCW around the lower pivot point 1204, wherein the pressure in the combustion chamber 204 is near atmospheric pressure regardless of the demanded power output. At less than maximum power output, the intake valve 1206 will remain open as compression begins, but will close at some point during the compression cycle.

Figure 15:
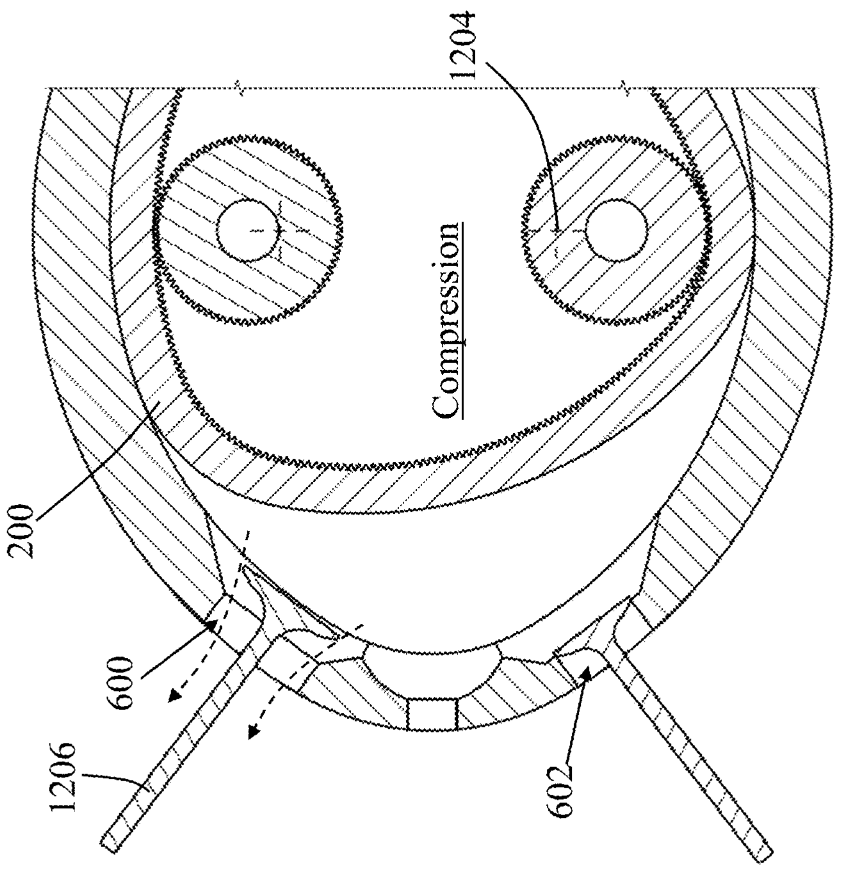

With reference to FIG. 15, the rotor 200 is depicted rotated another 20° CCW from the position depicted in FIG. 14 and about the pivot point 1204. At less than maximum power output, the intake valve 1206 may remain open allowing fluid to remain near atmospheric pressure and excess fluid to flow backwards into the intake manifold. As such, the positioning of the rotor 200 is in accordance with a classical Atkinson cycle operation. In one example, an external computer may determine when to close the intake valve 1206 based on the oxygen required to supply stoichiometric burning of gasoline sufficient to produce the required torque after accounting for heath and friction losses. The combined control of oxygen and gasoline into the combustion chamber 204 allows for optimal combustion to minimize NOx and CO pollution. The torque produced is a function of the amount of gasoline burned during each combustion cycle and the number of combustion cycles occurring each minute (RPM). At the appropriate time, the intake valve 1206 closes, and compression of the remaining fluid begins. After the intake valve 1206 closes, gasoline mist is injected into the combustion chamber 204 and is mixed with the air fluid. Turbulence generated as the rotor 200 reaches maximum compression aids in the uniform distribution gasoline.

Figure 16:
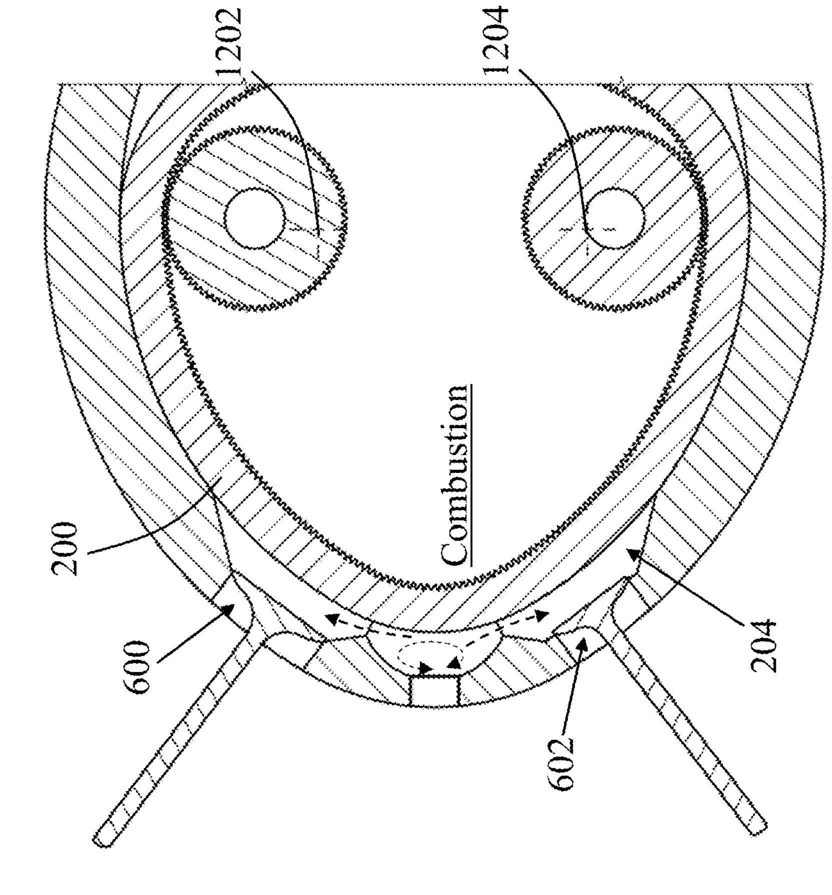

With reference to FIG. 16, the combustion chamber 204 can be seen at maximum pressure at the end of the compression cycle and beginning of the combustion cycle. A spark is produced at the appropriate time to initiate the combustion process. At this instant, the 60-degree pivot around the lower pivot point 1204 depicted in FIG. 14 has completed and the rotor 200 again begins pivoting CCW around the upper pivot point 1202. Pressure created by combustion applies a force against the rotor 200 and because of the offset pivot point, this pressure induces torque urging the rotor 200 to continue motion in the CCW rotation.

Figure 17:
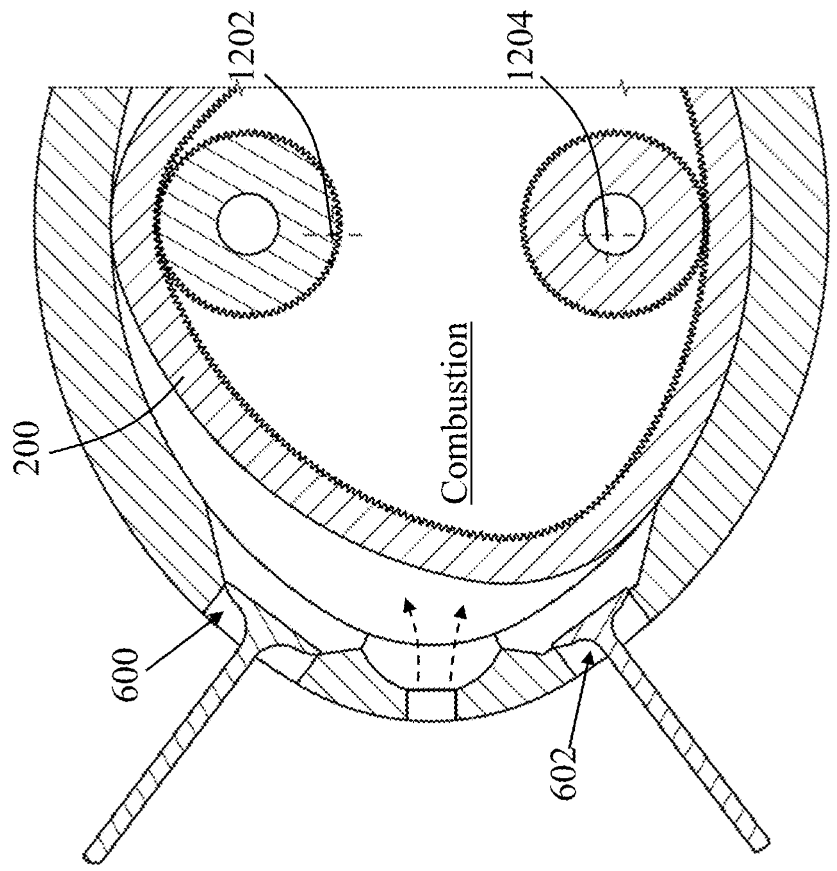

With reference FIG. 17, the rotor 200 is depicted rotated 20° CCW during the combustion cycle. Again, the rate of volume change in the combustion chamber 204 remains uniform throughout the cycle and allows the engine to efficiently extract torque throughout the entire cycle. Beneficially, this is contrary to a piston engine where the sinusoidal function of the crank angle dramatically reduces efficiency as the piston approaches BDC.

Figure 18:
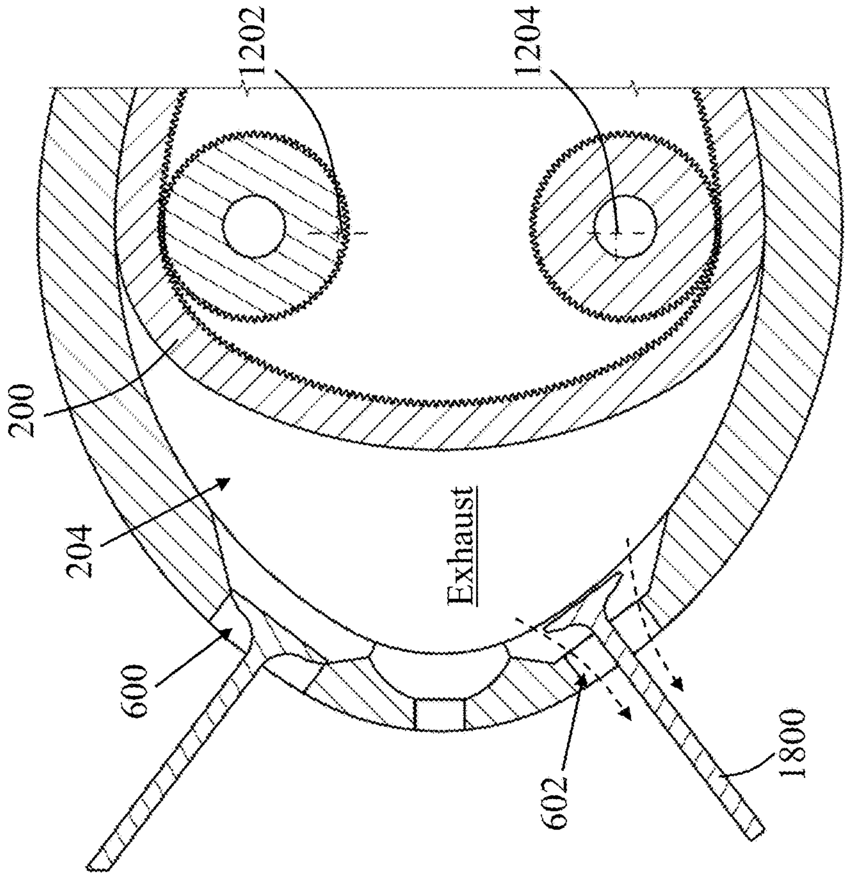

With reference to FIG. 18, the rotor 200 is depicted in a position with the combustion chamber 204 having reached its maximum volume and minimum residual pressure. The rotor 200 has pivoted 60° around the upper pivot point 1202 and would then begin pivoting around the lower pivot point 1204 again. At this point, the exhaust cycle will begin and an exhaust valve 1800 may then be opened to allow the expulsion of spent fluid. If the engine is operating at less than maximum power, resulting in pressure reduction earlier in the combustion cycle, the controlling computer can open the exhaust valve 1800 earlier to assist in functions such as scavenging exhaust gasses via harmonic oscillations.

Figure 19:
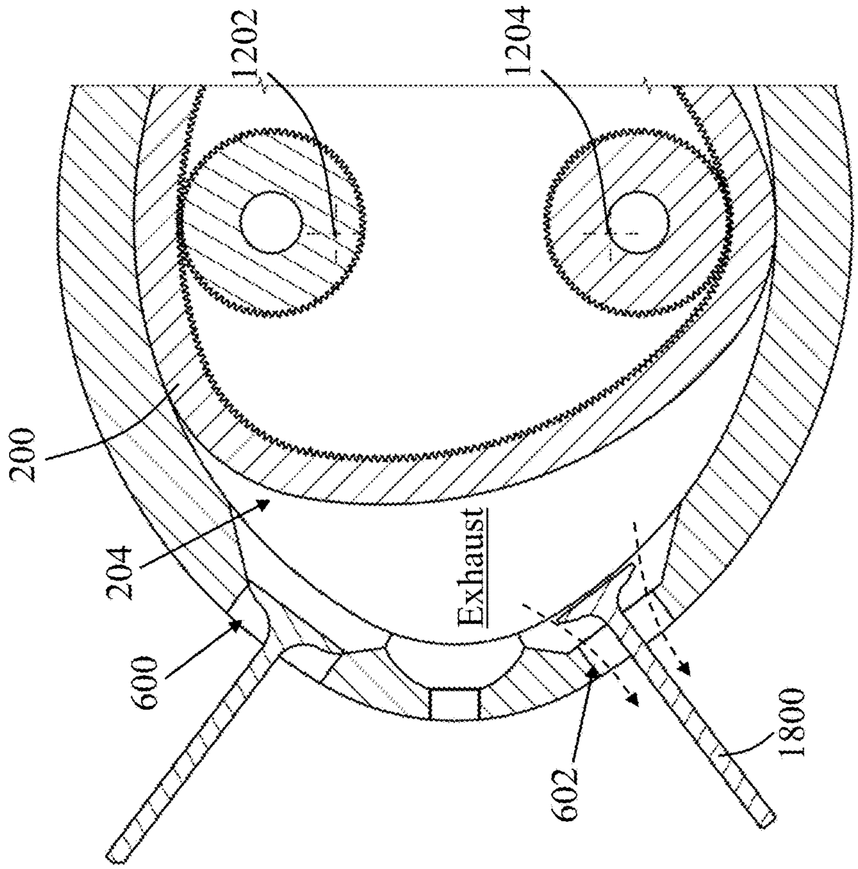
Figure 20:
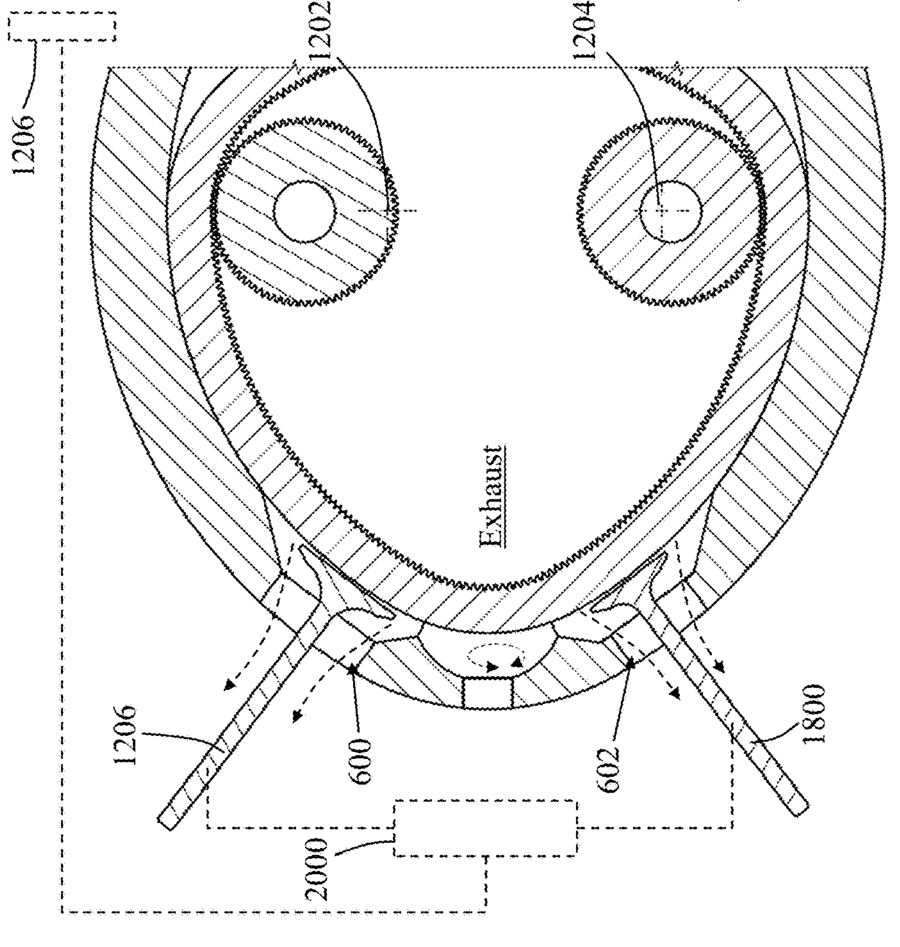
Figure 23:
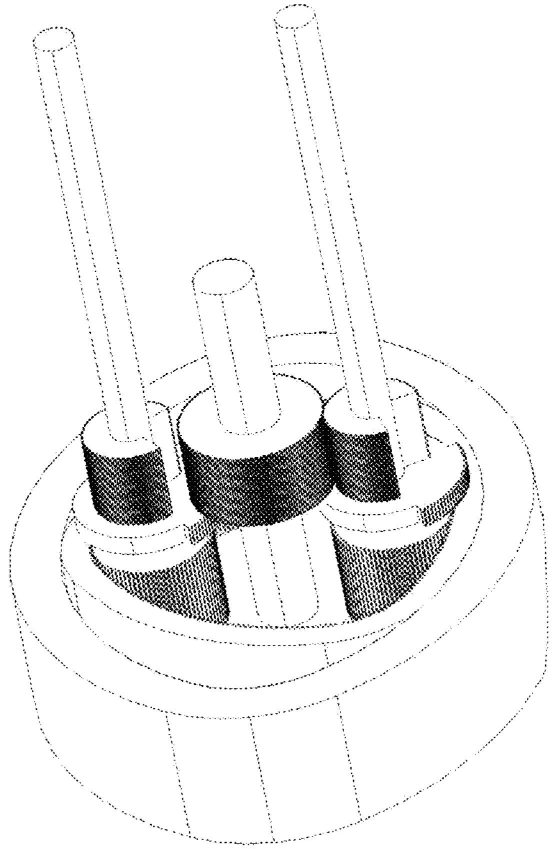
FIG. 23 depicts a fragmentary and perspective view of the rotor engine with the stator housing, rotor, output shaft, and first and second planetary gear shafts in accordance with one embodiment of the present invention.

With reference to FIG. 19, the rotor 200 is depicted in a pivoted position 20° CCW from the position of the rotor 200 depicted in FIG. 18. The exhaust valve 1800 is still open permitting fluid to flow out of the combustion chamber 204 at low pressure. Now referring to FIG. 20, the rotor 200 is depicted 60° CCW from the position of the rotor 200 depicted in FIG. 18 as it completes the 60-degree pivot of the exhaust cycle. Having completed the pivot around the lower pivot point 1204, additional pivoting transfers to the upper pivot point 1202. In FIG. 20, both the intake valve 1206 and the exhaust valve 1800 are open to facilitate scavenging of spent gasses, as is common in piston engines. Again, valve opening and closing is preferably electronically controlled by an electronic controller or computer (depicted in FIG. 20 with numeral 2000) to optimize performance. At this point the exhaust cycle has been completed, and operation returns to FIG. 12.

Figure 21:
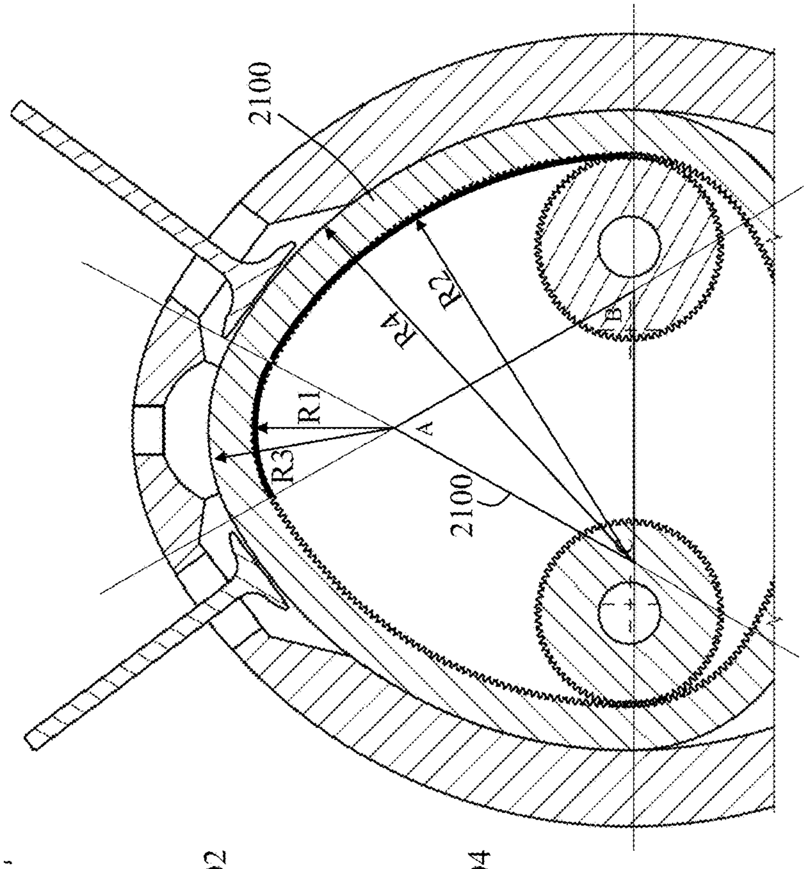
FIG. 21 depicts a fragmentary cross-sectional view of a rotor and stator housing illustrating how to construct the rotor shape and dimensions in accordance with one embodiment of the present invention.

FIG. 21 depicts a cross-sectional view of the engine assembly with an imaginary triangle and arc lengths demonstrating how to construct a fake circle rotor 2100 operable in the assembly 100. First, an equilateral triangle is constructed within the rotor area with a known side length, S or 2100, e.g., 90 mm. The vertices of the triangle are labeled with letters, A, B, C in a clockwise order. At each vertex, a circle of a known radius, R1, e.g., 45 mm, is constructed. At each vertex, construct a circular arc centered on those vertices and tangent to the 45 mm circles of the other two vertices. As exemplified in FIG. 21, this arc would have a radius, R2, of 135 MM. Construct the fake circle curve by alternating the 45 mm arcs and 135 mm arcs connecting at the point of tangency to complete the smooth continuous closed curve of the inside of the rotor. As such, the major chord will have a length of 180 mm. Rather than passing through a "center", all major chords will pass through one of the vertices, A, B, or C. Three major chords will pass through two vertices. Thus, the major chord can be calculated, R1+S+R1. Extending the sides of the triangle to the fake circle curve, they will intersect the curves at the points of tangency. It can be shown that the R1 arc and R2 arc each span a 60-degree angle from their respective center. Similar calculations can be carried out for R3 and R4, which are 60 mm and 150 mm, respectively.

In a circle, all major chords are called diameters and all pass through the circle center. If you roll a cylinder with a circular cross section on a flat surface, the diameter touching the point of contact with the flat surface is vertical and again passes through the circle center. As the cylinder rolls, it has a center of rotation at the circle center. Utilizing a fake circle cross section and placed to on a flat surface, the rotor will come to rest with a point of contact centered on a larger arc. The vertices used to generate this arc will be at its maximum elevation. The maximum chord at the point of contact will be vertical and pass though this vertices. As the cylinder with a fake circle cross section rolls, its center of rotation will initially be through this vertices. However, when the point of contact reaches the junction of the larger arc and smaller arc, the major chord will still be vertical but will now pass through two vertices. Continuing the roll, the cylinder will now be rolling on the smaller arc and the center of rotation will now be the lower of the two vertices. As the roll continues, the center of rotation will alternate between the upper and lower vertices each time the major chord is one of the three chords that pass through two vertices.

When applied to the present invention, the fake circle rotor, when rolling on a flat surface and as the center of rotation transitions between the upper and lower vertices, the major chords were oriented vertically and had a constant length. At the time of transition, the third vertices was at a maximum displacement either to the right or left. The area of the fake circle one side of the major chord was at a minimum and the area on the other side is at a maximum. During the next transition, the third vertices will be on the other side of the maximum chord. The maximum and minimum areas will also swap sides. In a rotary engine application, the active point of rotation is held fixed on a vertical line. When the second vertices move on to the same vertical line, the transition occurs. It should be noted that the direction of rotation remains the same and only the center of rotation changes. Further, the present invention provides an unconstrained design variable axial rotor width, wherein adjusting the rotor width establishes a maximum displacement and the functional range of compression ratios. The amount of air charge for each combustion cycle is still maintained by intake valve closure delays. The design variable axial rotor width enables normalized operation allowing a full oxygen charge to be maintained with each combustion cycle even at altitude. It also extends the displacement while retaining limits on oxygen admittance extends the power cycle improving thermal efficiency.

Since both the smaller and larger arcs were bounded by the sides of the equilateral triangle, each arc spans 60 degrees. This means that every transition between the upper and lower vertices occurs after 60 degrees of rotation. The rotary engine has two combustion chambers, one on the right and the other on the left. With each 60 degree movement, one chamber is at its maximum displacement while the other chamber is at its minimum. Call each 60 degree rotation a pivot and the position of the vertices on the vertical line a pivot point. Let the combination of one upper pivot and one lower pivot be called a pivot set. After a pivot set is completed, the rotor will be back in its original position. Thus, one pivot set would be the equivalent of one crankshaft rotation in a conventional piston engine. The vertical major chord must pass through the active upper or lower pivot point therefore it must always lie on the same vertical line holding the pivot points. This provides a fixed location for seals mounted in the stator separating the left and right combustion chambers.

Figure 22:
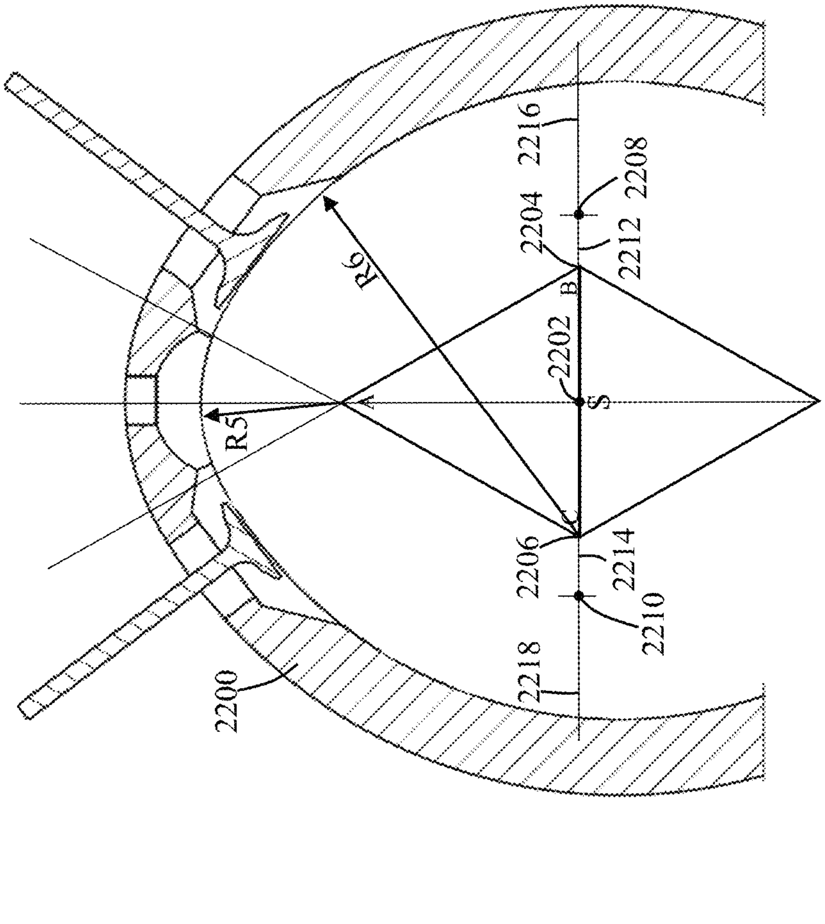
FIG. 22 depicts a cross a fragmentary cross-sectional view of the stator housing in FIG. 21 illustrating how to construct the stator housing shape and dimensions in accordance with one embodiment of the present invention.

With reference to FIG. 22, a fragmentary cross-sectional view of a stator housing 2200 for use with the rotor 2100 in FIG. 21 is depicted. Specifically, two equilateral triangles as dimensioned in FIG. 21 are connected about one of their respective bases. An angular bisector line passes through each of the A vertices and the side lines for each of the sides forming the A vertices are extended passed the respective A vertice. The bisector line passes through the origin 2202 or centroid of the constructed stator housing 2200. The origin 2202 would be axially aligned with, or forming center of, the output shaft 102 (depicted in FIG. 1). Vertices B and C would be the upper pivot point 2204 and lower pivot point 2206, respectively. The base line is extended outwardly from the vertices B and C that is equivalent in length extending from each vertice to R4-0.5S, wherein S is the length of the sides of the equilateral triangle. To correspond with the outer surface of the rotor, a radius, R5, forming the inner surface of the stator housing and is also 60 mm. Radius, R6, which would be tangent to the circle formed by R3 around vertice A, would be 150 mm. Points 2208, 2210 are generated a length of R5 each of the base lines lengths 2212, 2214 that equal R5, wherein points 2208, 2210 form the center of the first and second planetary shafts 206, 210 (best exemplified in FIG. 2), respectively. The remaining lengths 2216, 2218 of the base line extending to upper and lower seals will be 105 mm. Lines are also extended, positioned, and centered about the centroid of the stator (as exemplified in FIG. 22).

Figure 25:
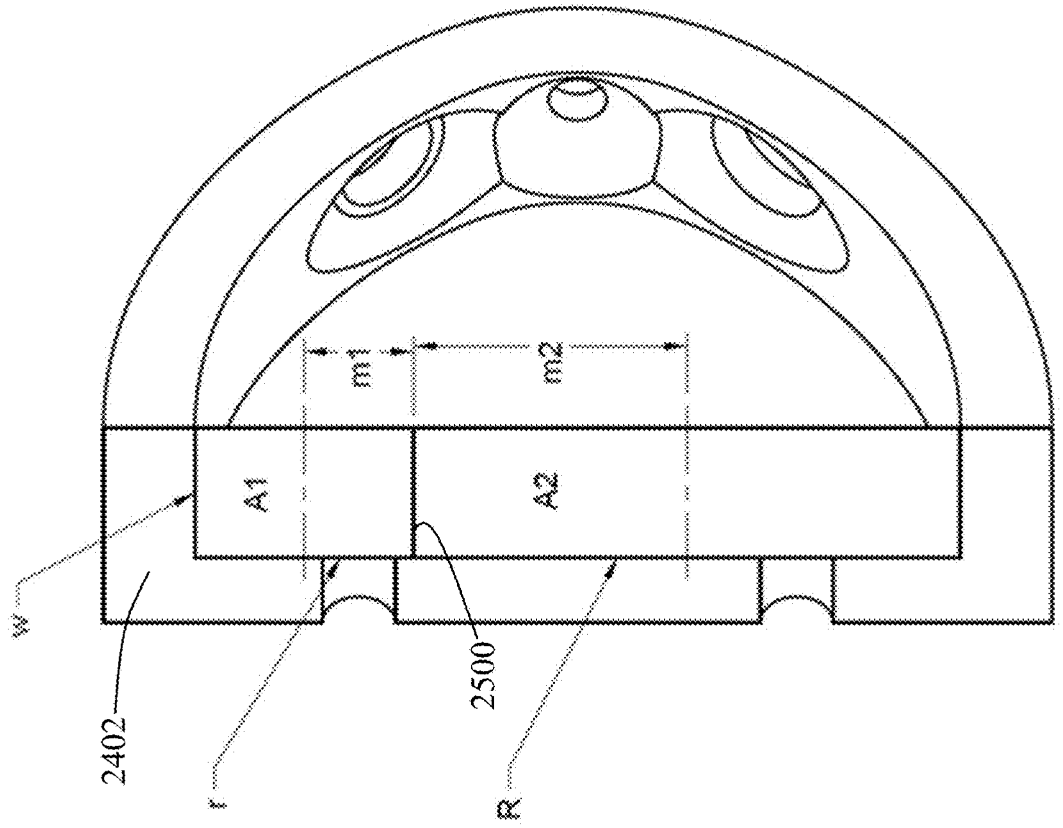
FIGS. 24-25 depict fragmentary views of an exemplary rotor and stator housing and stator housing with dimensions depicting exemplary torque output, respectively, in accordance with one embodiment of the present invention.
Figure 24:
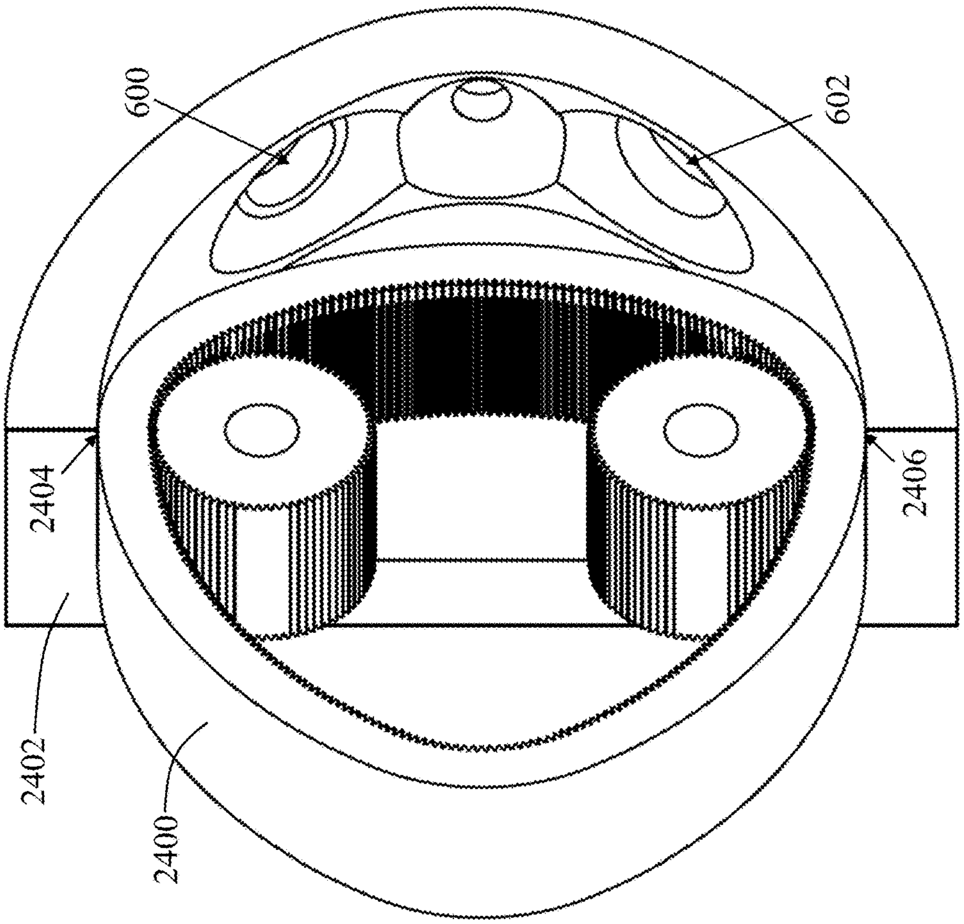

With reference to FIGS. 24-25, fragmentary views of an exemplary rotor 2400 and stator housing 2402 and stator housing 2402, respectively, are depicted. As discussed above, the present invention overcomes many deficiencies and effectively transmits torque to the output shaft 102 (depicted in FIG. 1) with no linear motion of the components within the assembly. FIG. 24 depicts a fragmentary and sectional view the stator housing 2402 sectioned through the location of the apex seals 2404, 2406. The rotor 2402 may be considered the equivalent to a piston engine. During the combustion cycle, however, the rotor 2402 experiences a pressure across the width of the rotor 2402 from apex seal 2404 to apex seal 2406. The equivalent of a cylinder bore in a piston engine is depicted in FIG. 25, wherein the bore consists of combined areas A1 and A2. The rotor 2402 is allowed to rotate around a pivot axis, e.g., axis 2500. The smaller area, A1, is above the pivot axis 2500 and the larger area, A2, is below the pivot axis 2500. The pressure applied to A1 would urge the rotor to rotate CW, while the larger area, A2, would urge the rotor to rotate CCW. Besides the smaller area of A1 seeing less force than A2, A1's torque moment arm, m1, is a small fraction of the A2's moment arm, m2. The net torque applied to the rotor is therefore A2×m2-A1×m1.

As the lengths, r, R affect both the area and moment arm, the torque applied to A2 varies with the square of ratio R:r. Thus, if the ratio is 2.5:1, A2 contributes 6.25 times the torque CCW compared to A1 CW torque. The output shaft sees a net torque of (6.25-1) or 84% efficiency. Additionally, this torque efficiency is constant throughout the combustion cycle versus the piston engine average sine function value of some 63%.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A rotary engine with dual axis rotor rotation comprising:

a stator housing with an inner wall surface defining a combustion chamber;

a first rotor disposed within the combustion chamber, defining a first rotor cavity, and having three lobes;

a second rotor disposed within the combustion chamber, defining a second rotor cavity, and having three lobes;

an output shaft operably configured to rotate in a clockwise direction, disposed in the first rotor cavity and the second rotor cavity, and having a first plurality of first rotor drive gears fixedly coupled to the output shaft and each of a different radius and a second plurality of second rotor drive gears fixedly coupled to the output shaft and each of a different radius;

a first planetary shaft:

coupled to the stator housing in a stationary configuration;

disposed in the first rotor cavity and the second rotor cavity;

flanking and parallel to the output shaft;

having a first planetary gear set axially disposed on, and operably configured to freely rotate on, the first planetary shaft, with a first shaft first rotor planetary rotor gear operably couplable to the first rotor, and with a plurality of first planetary shaft first rotor drive gears operably couplable to the first plurality of first rotor drive gears and each of a different radius; and having a second planetary gear set axially disposed on, and operably configured to freely rotate on, the first planetary shaft, with a first shaft second rotor planetary rotor gear operably couplable to the second rotor, and with a plurality of first planetary shaft second rotor drive gears operably couplable to the second plurality of second rotor drive gears and each of a different radius; and a second planetary shaft:

coupled to the stator housing in a stationary configuration;

disposed in the first rotor cavity and the second rotor cavity;

flanking and parallel to the output shaft;

having a first planetary gear set axially disposed on, and operably configured to freely rotate on, the second planetary shaft, with a second shaft first rotor planetary rotor gear operably couplable to the first rotor, and with a plurality of second planetary shaft first rotor drive gears operably couplable to the first plurality of first rotor drive gears, each of a different radius, and operably configured to be in phase with the plurality of first planetary shaft first rotor drive gears; and having a second planetary gear set axially disposed on, and operably configured to freely rotate on, the second planetary shaft, with a second shaft second rotor planetary rotor gear operably couplable to the second rotor, and with a plurality of second planetary shaft second rotor drive gears operably couplable to the second plurality of second rotor drive gears, each of a different radius, and operably configured to be in phase with the plurality of second planetary shaft first rotor drive gears, wherein the first and second planetary gear sets on the respective first and second planetary shafts are operably configured to generate a dual axis, eccentric, counterclockwise, and out-of-phase rotation for the first and second rotors.

2. The rotary engine with dual axis rotor rotation according to claim 1, wherein the first planetary gear set on the first planetary shaft is axially aligned with the second planetary gear set on the first planetary shaft and the first planetary gear set on the second planetary shaft is axially aligned with the second planetary gear set on the second planetary shaft.

3. The rotary engine with dual axis rotor rotation according to claim 1, wherein the first planetary shaft and the second planetary shaft are disposed in a parallel configuration with one another.

4. The rotary engine according to claim 1, wherein the first and second rotors are of a triangular shape and having a smooth continuous circumferential surface surrounding a perimeter of the first and second rotors.

5. The rotary engine with dual axis rotor rotation according to claim 1, wherein the stator housing further comprises:

a front plate, a rear plate, and a center housing flanked and coupled to the front and rear plates on respective opposing ends of the center housing and defining, with the front and rear plates, the combustion chamber.

6. The rotary engine according to claim 1, wherein the first and second rotors are made of a material composition of aluminum alloy with approximately 75% aluminum and 15% silicon.

7. The rotary engine with dual axis rotor rotation according to claim 1, further comprising:

the first plurality of first rotor drive gears having a first rotor high-speed drive gear defining a radius and having a first rotor low-speed drive gear defining a radius greater than the radius of the first rotor high-speed drive gear for the first plurality of first rotor drive gears; and the second plurality of second rotor drive gears having a second rotor high-speed drive gear defining a radius equal to the radius of the first rotor high-speed drive gear for the first plurality of first rotor drive gears and having a second rotor low-speed drive gear defining a radius greater than the radius of the second rotor high-speed drive gear for the second plurality of second rotor drive gears and equal to the radius of the first rotor low-speed drive gear for the first plurality of first rotor drive gears.

8. The rotary engine with dual axis rotor rotation according to claim 7, further comprising:

the plurality of first planetary shaft first rotor drive gears having:

a planetary shaft high-speed gear with a discontinuous row of teeth defining a first high-speed gear (HSG) radius and operably couplable to the first rotor high-speed drive gear for the first plurality of first rotor drive gears; and a planetary shaft low-speed gear with a discontinuous row of teeth defining a first low-speed gear (LSG) radius less than the first HSG radius defined by the planetary shaft high-speed gear on the plurality of first planetary shaft first rotor drive gears and operably couplable to the first rotor low-speed drive gear on the first plurality of first rotor drive gears;

the plurality of first planetary shaft second rotor drive gears having:

a planetary shaft high-speed gear with a discontinuous row of teeth defining a first HSG radius and operably couplable to the second rotor high-speed drive gear for the second plurality of second rotor drive gears; and a planetary shaft low-speed gear with a discontinuous row of teeth defining a first LSG radius less than the first HSG radius defined by the planetary shaft high-speed gear on the plurality of first planetary shaft second rotor drive gears and operably couplable to the second rotor low-speed drive gear on the second plurality of second rotor drive gears;

the plurality of second planetary shaft first rotor drive gears having:

a planetary shaft high-speed gear with a discontinuous row of teeth defining a first HSG radius and operably couplable to the first rotor high-speed drive gear for the first plurality of first rotor drive gears; and a planetary shaft low-speed gear with a discontinuous row of teeth defining a first LSG radius less than the first HSG radius defined by the planetary shaft high-speed gear on the plurality of second planetary shaft first rotor drive gears and operably couplable to the first rotor low-speed drive gear on the first plurality of first rotor drive gears; and the plurality of second planetary shaft second rotor drive gears having:

a planetary shaft high-speed gear with a discontinuous row of teeth defining a first HSG radius and operably couplable to the second rotor high-speed drive gear for the second plurality of second rotor drive gears; and a planetary shaft low-speed gear with a discontinuous row of teeth defining a first LSG radius less than the first HSG radius defined by the planetary shaft high-speed gear on the plurality of second planetary shaft second rotor drive gears and operably couplable to the second rotor low-speed drive gear on the second plurality of second rotor drive gears.

9. The rotary engine with dual axis rotor rotation according to claim 8, further comprising:

a circumferential gap separating the discontinuous row of teeth on the planetary shaft low-speed gear for the plurality of first planetary shaft first rotor drive gears and circumferentially aligned with the discontinuous row of teeth on the planetary shaft high-speed gear for the plurality of first planetary shaft first rotor drive gears;

a circumferential gap separating the discontinuous row of teeth on the planetary shaft low-speed gear for the plurality of first planetary shaft second rotor drive gears and circumferentially aligned with the discontinuous row of teeth on the planetary shaft high-speed gear for the plurality of first planetary shaft second rotor drive gears;

a circumferential gap separating the discontinuous row of teeth on the planetary shaft low-speed gear for the plurality of second planetary shaft first rotor drive gears and circumferentially aligned with the discontinuous row of teeth on the planetary shaft high-speed gear for the plurality of second planetary shaft first rotor drive gears; and a circumferential gap separating the discontinuous row of teeth on the planetary shaft low-speed gear for the plurality of second planetary shaft second rotor drive gears and circumferentially aligned with the discontinuous row of teeth on the planetary shaft high-speed gear for the plurality of second planetary shaft second rotor drive gears.

10. The rotary engine according to claim 9, further comprising:

equidistant gap arc lengths respectively defined by the circumferential gaps for each of the planetary shaft low-speed gears for the plurality of first planetary shaft first rotor drive gears, the plurality of first planetary shaft second rotor drive gears, the plurality of second planetary shaft first rotor drive gears, and the plurality of second planetary shaft second rotor drive gears, wherein each of the equidistant gap arc lengths are equal to equidistant arc lengths defined by the planetary shaft high-speed gears for the plurality of first planetary shaft first rotor drive gears, the plurality of first planetary shaft second rotor drive gears, the plurality of second planetary shaft first rotor drive gears, and the plurality of second planetary shaft second rotor drive gears.

11. The rotary engine with dual axis rotor rotation according to claim 8, further comprising:

a center plate coupled to the inner wall surface of the stator housing, interposed between the plurality of first planetary shaft first rotor drive gears and the plurality of first planetary shaft second rotor drive gears, interposed between the plurality of second planetary shaft first rotor drive gears and the plurality of second planetary shaft second rotor drive gears, and interposed between the first plurality of first rotor drive gears and the second plurality of second rotor drive gears to generate:

a first combustion chamber with the first rotor, the plurality of first planetary shaft first rotor drive gears, the plurality of second planetary shaft first rotor drive gears, and the first plurality of first rotor drive gears disposed therein; and a second combustion chamber with the second rotor, the plurality of first planetary shaft second rotor drive gears, the plurality of second planetary shaft second rotor drive gears, and the second plurality of second rotor drive gears.

12. The rotary engine with dual axis rotor rotation according to claim 11, wherein the plurality of first planetary shaft first rotor drive gears and the plurality of second planetary shaft first rotor drive gears are disposed in a rotationally inversely and symmetrical orientation to the plurality of first planetary shaft second rotor drive gears and the plurality of second planetary shaft second rotor drive gears relative to the center plate.

13. The rotary engine with dual axis rotor rotation according to claim 11, wherein the stator housing further comprising:

a first enclosed spark plug port defined thereon and fluidly coupled to the first combustion chamber and a second enclosed spark plug port defined thereon and fluidly coupled to the second combustion chamber, the first and second enclosed spark plug ports each having a spark plug disposed therein;

an enclosed intake port defined thereon and fluidly coupled to the first combustion chamber and a second enclosed intake port defined thereon and fluidly coupled to the second combustion chamber, the first and second enclosed intake ports each having an intake valve disposed therein; and an enclosed exhaust port defined thereon and fluidly coupled to the first combustion chamber and a second enclosed exhaust port defined thereon and fluidly coupled to the second combustion chamber, the first and second enclosed exhaust ports each having an exhaust valve disposed therein.

14. The rotary engine with dual axis rotor rotation according to claim 13, wherein the spark plug, the exhaust valve, and the intake valve are communicatively coupled to an electronic controller.

* * * * *